US012711196B2

(12) United States Patent
Ideguchi

(10) Patent No.: US 12,711,196 B2
(45) Date of Patent: Aug. 18, 2026

(54) INFORMATION PROCESSING APPARATUS WHICH OBTAINS SUBMATRICES BASED ON AN INPUT SPARSE MATRIX

(71) Applicant: NEC Corporation, Tokyo (JP)

(72) Inventor: Yuta Ideguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1241 days.

(21) Appl. No.: 17/630,621

(22) PCT Filed: Aug. 2, 2019

(86) PCT No.: PCT/JP2019/030484

§ 371 (c)(1),
(2) Date: Jan. 27, 2022

(87) PCT Pub. No.: WO2021/024300

PCT Pub. Date: Feb. 11, 2021

(65) Prior Publication Data

US 2022/0253507 A1 Aug. 11, 2022

(51) Int. Cl.
*G06F 17/16* (2006.01)
*G06F 7/50* (2006.01)
(Continued)

(52) U.S. Cl.
CPC ................ *G06F 17/16* (2013.01); *G06F 7/50* (2013.01); *G06F 7/523* (2013.01); *G06F 7/535* (2013.01); *G06F 7/5443* (2013.01); *G06F 7/76* (2013.01)

(58) Field of Classification Search
CPC . G06F 17/16; G06F 7/50; G06F 7/523; G06F 7/535; G06F 7/5443
See application file for complete search history.

(56) References Cited

U.S. PATENT DOCUMENTS 6,064,808 A 5/2000 Kapur et al.
11,392,829 B1 * 7/2022 Pool ........................ G06F 17/16
(Continued)

FOREIGN PATENT DOCUMENTS

JP 2009-049463 A 3/2009
JP 2016-066329 A 4/2016
WO 2017/154946 A1 9/2017

OTHER PUBLICATIONS

International Search Report for PCT Application No. PCT/JP2019/030484, mailed on Oct. 1, 2019.

*Primary Examiner* — Michael D. Yaary
(74) *Attorney, Agent, or Firm* — Sughrue Mion, PLLC

(57) ABSTRACT

A first transforming unit divides a sparse matrix into a first submatrix including a row in which the number of non-zero elements is a predetermined number or more and a second submatrix including a row other than the row, and transforms the first submatrix into a row-major order dense matrix format. A second transforming unit divides the second submatrix into a third submatrix including a column in which the number of non-zero elements is a predetermined number or more and a fourth submatrix including a column other than the column, and transforms the third submatrix into a column-major order dense matrix format. A third transforming unit divides the fourth submatrix into a fifth submatrix and a sixth submatrix, and transforms the fifth submatrix into a row-major order sparse matrix compression format. A fourth transforming unit transforms the sixth submatrix into a column-major order sparse matrix compression format.

5 Claims, 33 Drawing Sheets

(51) Int. Cl.

| | |
|---|---|
| ***G06F 7/523*** | (2006.01) |
| ***G06F 7/535*** | (2006.01) |
| ***G06F 7/544*** | (2006.01) |
| ***G06F 7/76*** | (2006.01) |

(56) References Cited

U.S. PATENT DOCUMENTS

2019/0042237 A1* 2/2019 Azizi .................. G06F 9/30038
2019/0050371 A1 2/2019 Araki

* cited by examiner

| | 0 | 1 | 2 | 3 | 4 | 5 | 6 | 7 | 8 |
|---|---|---|---|---|---|---|---|---|---|
| 0 | 1 | 2 | 3 | 4 | 5 | 6 | 7 | | 8 |
| 1 | 9 | | | | 10 | | 11 | | |
| 2 | 12 | | 13 | 14 | 15 | | 16 | 17 | 18 |
| 3 | 19 | | | | | 20 | 21 | | 22 |
| 4 | 23 | | 24 | 25 | | | | | |
| 5 | 26 | | | | | | | | |
| 6 | 27 | | | 28 | 29 | | 30 | | |
| 7 | 31 | | | 32 | | | 33 | | |
| 8 | 34 | 35 | | 36 | | 37 | | | |
| 9 | 38 | | | | 39 | 40 | 41 | 42 | |

| | 0 | 1 | 2 | 3 | 4 | 5 | 6 | 7 | 8 |
|---|---|---|---|---|---|---|---|---|---|
| 1 | 9 | | | | 10 | | 11 | | |
| 3 | 19 | | | | | 20 | 21 | | 22 |
| 4 | 23 | | 24 | 25 | | | | | |
| 5 | 26 | | | | | | | | |
| 6 | 27 | | | 28 | 29 | | 30 | | |
| 7 | 31 | | | 32 | | | 33 | | |
| 8 | 34 | 35 | | 36 | | 37 | | | |
| 9 | 38 | | | | 39 | 40 | 41 | 42 | |

| | 0 | 1 | 2 | 3 | 4 | 5 | 6 | 7 | 8 |
|---|---|---|---|---|---|---|---|---|---|
| 0 | 1 | 2 | 3 | 4 | 5 | 6 | 7 | 0 | 8 |
| 2 | 12 | 0 | 13 | 14 | 15 | 0 | 16 | 17 | 18 |

| | 1 | 2 | 3 | 4 | 5 | 7 | 8 |
|---|---|---|---|---|---|---|---|
| 1 | | | | 10 | | | |
| 3 | | | | | 20 | | 22 |
| 4 | | 24 | 25 | | | | |
| 5 | | | | | | | |
| 6 | | | 28 | 29 | | | |
| 7 | | | 32 | | | | |
| 8 | 35 | | 36 | | 37 | | |
| 9 | | | | 39 | 40 | 42 | |

| | 0 | 6 |
|---|---|---|
| 1 | 9 | 11 |
| 3 | 19 | 21 |
| 4 | 23 | 0 |
| 5 | 26 | 0 |
| 6 | 27 | 30 |
| 7 | 31 | 33 |
| 8 | 34 | 0 |
| 9 | 38 | 41 |

| | 0 | 6 |
|---|---|---|
| 8 | 34 | 0 |
| 9 | 38 | 41 |
| 3 | 19 | 21 |
| 4 | 23 | 0 |
| 6 | 27 | 30 |
| 1 | 9 | 11 |
| 7 | 31 | 33 |
| 5 | 26 | 0 |

=

| | |
|---|---|
| 8 | 35x2+36x4+37x6 |
| 9 | 39x5+40x6+42x8 |

FIG. 23

| | 0 | 1 | 2 | 3 | 4 | 5 | 6 | 7 | 8 |
|---|---|---|---|---|---|---|---|---|---|
| 0 | 1 | 2 | 3 | 4 | 5 | 6 | 7 | | 8 |
| 1 | 9 | | | | 10 | | 11 | | |
| 2 | 12 | | 13 | 14 | 15 | | 16 | 17 | 18 |
| 3 | 19 | | | | | 20 | 21 | | 22 |
| 4 | 23 | | 24 | 25 | | | | | |
| 5 | 26 | | | | | | | | |
| 6 | 27 | | | 28 | 29 | | 30 | | |
| 7 | 31 | | | 32 | | | 33 | | |
| 8 | 34 | 35 | | 36 | | 37 | | | |
| 9 | 38 | | | | 39 | 40 | 41 | 42 | |

×

| | |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |

=

| | |
|---|---|
| 0 | 1x1+2x2+3x3+4x4+5x5+6x6+7x7+8x9 |
| 1 | 9x1+10x5+11x7 |
| 2 | 12x1+13x3+14x4+15x5+16x7+17x8+18x9 |
| 3 | 19x1+20x6+21x7+22x9 |
| 4 | 23x1+24x3+25x4 |
| 5 | 26x1 |
| 6 | 27x1+28x4+29x5+30x7 |
| 7 | 31x1+32x4+33x7 |
| 8 | 34x1+35x2+36x4+37x6 |
| 9 | 38x1+39x5+40x6+41x7+42x8 |

FIG. 24

```
for(int r=0;r<nrow;r++)
        for(int c=0;c<ncol;c++)
                P' [r]+=Val[r*ncol+c]*U[c];
```

FIG. 25

```
for(int c=0;c<ncol;c++)
        int cc = Col[c];
    for(int r=0;r<nrow;r++)
            P' [r]+=Val[c*nrow+r]*U[cc];
```

FIG. 26

```
for(int r=0;r<nrow;r++)
        for(int id=off[r];id<off[r+1];id++)
                P' [r]+=Val[id]*U[Col[id]];
```

FIG. 27

```
for(int c=0;c<colmax;c++)
    for(int id=off[c];id<off[c+1];id++)
        P'[id-off[c]]+=Val[id]*U[Col[id]];
```

FIG. 28

```
for(int r=0;r<nrow;r++)
      P[Row[r]]=P'[r]
```

FIG. 30

| LABEL | USER NAME | ENVIRONMENT | TIME | FEATURE VALUE 1 | FEATURE VALUE 2 | . . . |
|---|---|---|---|---|---|---|

DENSE DATA

SPARSE DATA

W
U
P
CALCULATE Q FROM P
W^T
Q
Y
UPDATE U WITH Y

INFORMATION PROCESSING APPARATUS WHICH OBTAINS SUBMATRICES BASED ON AN INPUT SPARSE MATRIX

This application is a National Stage Entry of PCT/JP2019/030484 filed on Aug. 2, 2019, the contents of all of which are incorporated herein by reference, in their entirety.

TECHNICAL FIELD

The present invention relates to an information processing apparatus, an information processing method, and a program.

BACKGROUND ART

Since learning processing of learning a large amount of data and building a model, such as statistical machine learning, takes a very long time, it is required to speed up. In such learning processing, calculation is performed by expressing data as a sparse matrix. For example, in logistic regression (LR), a sparse matrix vector product is calculated. Therefore, it is important to calculate such a sparse matrix vector product at high speeds. Thus, many information processing methods have been proposed so far for the purpose of speeding up calculation of a sparse matrix vector product.

For example, in an information processing method described in Patent Document 1, a sparse matrix is stored in a plurality of compression formats. To be specific, the elements of a column in which the number of elements that are not zero (referred to as non-zero elements) in a sparse matrix is a predetermined number or more are stored in the JDS (Jugged Digital Storage) format, and the elements of the other column are stored in the CRS (Compressed Row Column) format. Then, the product of the sparse matrix and a vector is calculated by individually calculating the product of a submatrix stored in the JDS format and a vector and the product of a submatrix stored in the CRS format and the vector and calculating the sum of the results of the calculation.

Further, in an information processing method described in Patent Document 2, a sparse matrix is divided into a dense submatrix including rows in which the number of non-zero elements is a predetermined number or more and a sparse submatrix including rows in which the number of non-zero elements is less than the predetermined number, and the sparse submatrix is stored in a format of storing the numbers of a row and a column where non-zero elements exist and the values thereof (linked-list format).

Patent Document 1: WO2017/154946

Patent Document 2: Japanese Unexamined Patent Application Publication No. JP-A 2009-049463

Among sparse matrices, there is a type of matrix that a row including many non-zero elements exists in part of the matrix and a column including many non-zero elements exists in part of the matrix. When such a type of sparse matrix is divided into the JDS format and the CRS format and stored, for example, according to the method described in Patent Document 1, the row including many non-zero elements is uselessly divided into the JDS format and the CRS format. Therefore, it has been difficult to perform calculation of a sparse matrix vector product at high speeds. Moreover, when the above type of sparse matrix is divided and stored, for example, according to the method described in Patent Document 2, useless division of a dense submatrix including rows in which the numbers of non-zero elements are a predetermined number or more can be avoided, but a column in which many non-zero elements gather is stored in the linked list format. Therefore, it has been difficult to perform calculation of a sparse matrix vector product at high speeds.

SUMMARY

An object of the present invention is to provide an information processing apparatus solving the abovementioned problem, that is, a problem of difficulty in transformation of a sparse matrix in which a row and a column including many non-zero elements exist in part of the matrix into a format that enables calculation of the product of the sparse matrix and a vector at high speeds.

An information processing apparatus according to an aspect of the present invention includes: a first transforming unit configured to divide a sparse matrix into a first submatrix including a row in which a number of non-zero elements is a predetermined number or more and a second submatrix including a row other than the row and transform the first submatrix into a first matrix of row-major order dense matrix format; a second transforming unit configured to divide the second submatrix into a third submatrix including a column in which a number of non-zero elements is a predetermined number or more and a fourth submatrix including a column other than the column and transform the third submatrix into a second matrix of column-major order dense matrix format; a third transforming unit configured to divide the fourth submatrix into a fifth submatrix and a sixth submatrix and transform the fifth submatrix into a third matrix of row-major order sparse matrix compression format; and a fourth transforming unit configured to transform the sixth submatrix into a fourth matrix of column-major order sparse matrix compression format.

Further, an information processing method according to another aspect of the present invention includes: dividing a sparse matrix into a first submatrix including a row in which a number of non-zero elements is a predetermined number or more and a second submatrix including a row other than the row and transforming the first submatrix into a first matrix of row-major order dense matrix format; dividing the second submatrix into a third submatrix including a column in which a number of non-zero elements is a predetermined number or more and a fourth submatrix including a column other than the column and transforming the third submatrix into a second matrix of column-major order dense matrix format; dividing the fourth submatrix into a fifth submatrix and a sixth submatrix and transforming the fifth submatrix into a third matrix of row-major order sparse matrix compression format; and transforming the sixth submatrix into a fourth matrix of column-major order sparse matrix compression format.

Further, a non-transitory computer-readable recording medium according to another aspect of the present invention has a program recorded thereon. The program includes instructions for causing a computer to perform: a process to divide a sparse matrix into a first submatrix including a row in which a number of non-zero elements is a predetermined number or more and a second submatrix including a row other than the row and transform the first submatrix into a first matrix of row-major order dense matrix format; a process to divide the second submatrix into a third submatrix including a column in which a number of non-zero elements is a predetermined number or more and a fourth submatrix including a column other than the column and transform the third submatrix into a second matrix of column-major order dense matrix format; a process to divide the fourth submatrix into a fifth submatrix and a sixth submatrix and transform the fifth submatrix into a third matrix of row-major order sparse matrix compression format; and a process to transform the sixth submatrix into a fourth matrix of column-major order sparse matrix compression format.

With the configurations described above, the present invention enables transformation of a sparse matrix in which a row and a column including many non-zero elements exist in part of the matrix into a format that enables calculation of the product of the sparse matrix and a vector at high speeds.

BRIEF DESCRIPTION OF DRAWINGS

FIG. 4 is a view showing an example of a sparse matrix input by the information processing apparatus according to the first example embodiment of the present invention;

FIG. 8 is a view showing an example of a Rowmajor dense matrix generated from the sparse matrix in the information processing apparatus according to the first example embodiment of the present invention;

FIG. 23 is a view showing an example of calculation of the product of a sparse matrix and the vector;

FIG. 24 is a view showing an example of a program realizing a Rowmajor dense matrix vector product calculating unit in the information processing apparatus according to the second example embodiment of the present invention;

FIG. 25 is a view showing an example of a program realizing a Colmajor dense matrix vector product calculating unit in the information processing apparatus according to the second example embodiment of the present invention;

FIG. 26 is a view showing an example of a program realizing a CRS sparse matrix vector product calculating unit in the information processing apparatus according to the second example embodiment of the present invention;

FIG. 27 is a view showing an example of a program realizing a JDS sparse matrix vector product calculating unit in the information processing apparatus according to the second example embodiment of the present invention;

FIG. 28 is a view showing an example of a program realizing a row rearranging unit in the information processing apparatus according to the second example embodiment of the present invention;

FIG. 30 is a view showing an example of input data W in the information processing apparatus according to the third example embodiment of the present invention;

EXAMPLE EMBODIMENTS

Next, example embodiments of the present invention will be described in detail with reference to the drawings. In the following description, the respective indices of a matrix, a vector and an array start from 0. The row direction of a matrix is a direction in which the row index increases, which is the same as the downward direction. The column direction of a matrix is a direction in which the column index increases, which is the same as the rightward direction. An element whose row index and column index are i and j of a matrix X may be represented as $M_{ij}$. An element whose index is i of an array Y[ ] may be represented as Y[i].

First Example Embodiment

Figure 1:
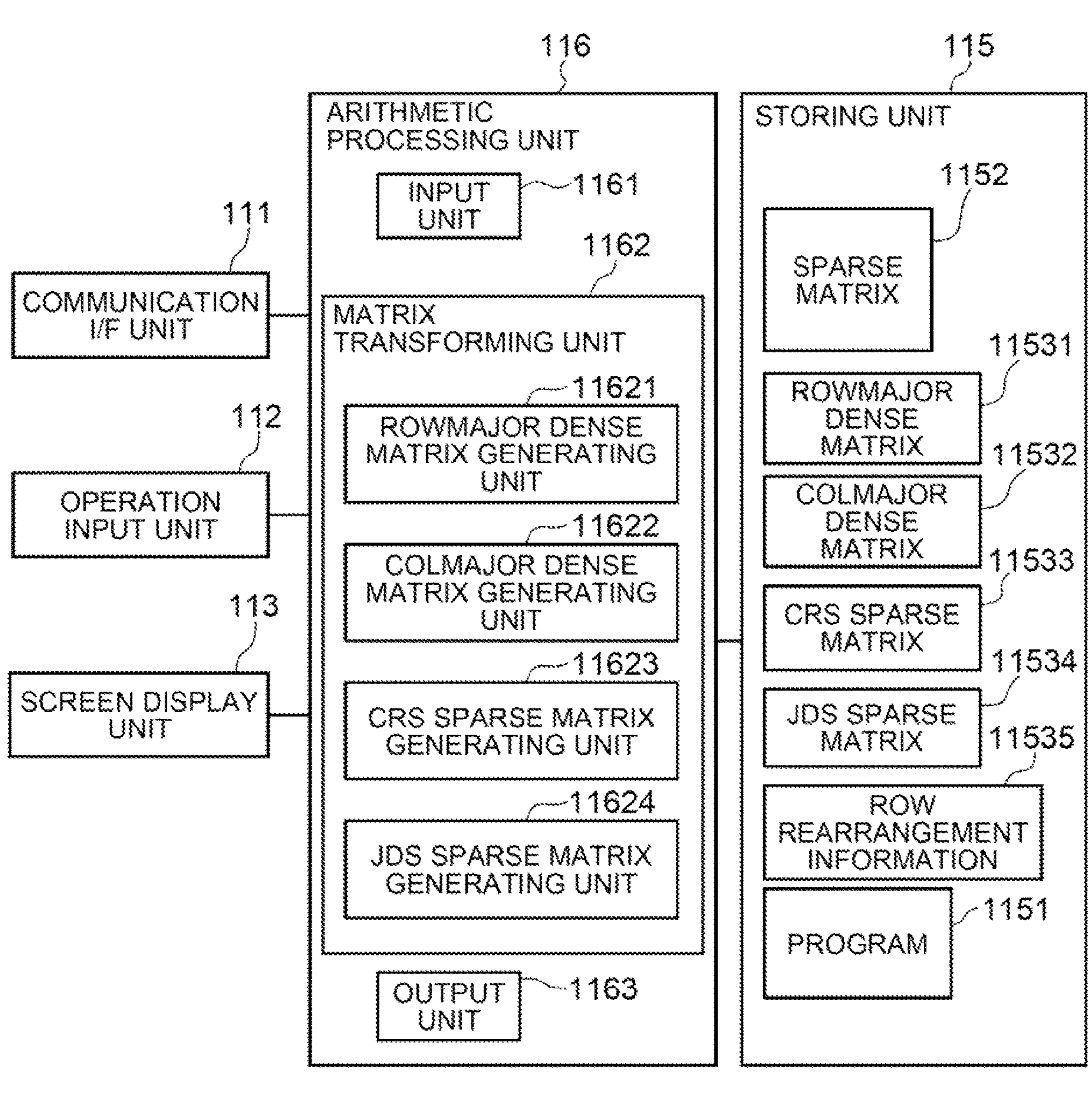
FIG. 1 is a block diagram of an information processing apparatus according to a first example embodiment of the present invention.

FIG. 1 is a block diagram of an information processing apparatus 100 according to a first example embodiment of the present invention. The information processing apparatus 100 is configured to divide an input sparse matrix into a plurality of submatrices of mutually different formats that can be multiplied by a vector to obtain products at high speeds and output the submatrices. Referring to FIG. 1, the information processing apparatus 100 includes a communication interface unit (hereinafter, referred to as the communication I/F unit) 111, an operation input unit 112, a screen display unit 113, a storing unit 115, and an arithmetic processing unit 116.

The communication I/F unit 111 is composed of a dedicated data communication circuit, and is configured to perform data communication with various devices (not shown) connected via a communication line (not shown). The operation input unit 112 is composed of operation input devices such as a keyboard and a mouse, and is configured to detect an operator's operation and output to the arithmetic processing unit 116. The screen display unit 113 is composed of a screen display device such as an LCD (Liquid Crystal Display) or a PDP (Plasma Display Panel), and is configured to display various information on a screen in response to an instruction from the arithmetic processing unit 116.

The storing unit 115 is composed of storage devices such as a hard disk and a memory, and is configured to store therein processing information and a program 1151 necessary for various processing in the arithmetic processing unit 116. The program 1151 is a program that is loaded to and executed by the arithmetic processing unit 116 to realize various processing units, and is previously loaded from an external device (not shown) or a storage medium (not shown) via a data input/output function such as the communication I/F unit 111 and stored into the storing unit 115. Major processing information stored in the storing unit 115 are a sparse matrix 1152, a Rowmajor dense matrix 11531, a Colmajor dense matrix 11532, a CRS sparse matrix 11533, a JDS sparse matrix 11534, and row rearrangement information 11535.

The sparse matrix 1152 is a sparse matrix to be transformed. Many of the elements of the sparse matrix 1152 are zero elements that are not necessary for processing. Moreover, some rows of the sparse matrix 1152 include many non-zero elements. Furthermore, some columns of the sparse matrix 1152 include many non-zero elements.

The Rowmajor dense matrix 11531, the Colmajor dense matrix 11532, the CRS sparse matrix 11533, and the JDS sparse matrix 11534 are submatrices generated by transforming the sparse matrix 1152. The row rearrangement information 11535 is information showing how the rows of the entire sparse matrix 1152 are rearranged by transformation processing.

The arithmetic processing unit 116 includes a processor such as a MPU (Micro Processing Uni) or a GPU (Graphics Processing Unit) and a peripheral circuit thereof, and is configured to, by loading the program 1151 from the storing unit 115 and executing the program 1151, make the above-mentioned hardware cooperate with the program 1151 and realize various processing units. Major processing units realized by the arithmetic processing unit 116 are an input unit 1161, a matrix transforming unit 1162, and an output unit 1163.

The input unit 1161 is configured to input the sparse matrix 1152 through the operation input unit 112 or/and the communication I/F unit 111 and store into the storing unit 115.

The matrix transforming unit 1162 is configured to retrieve the sparse matrix 1152 from the storing unit 115, perform matrix transformation processing to generate the Rowmajor dense matrix 11531, the Colmajor dense matrix 11532, the CRS sparse matrix 11533 and the JDS sparse matrix 11534, and store into the storing unit 115. The matrix transforming unit 1162 is also configured to, when performing rearrangement of the rows of the sparse matrix 1152 during the matrix transformation processing, generate the row rearrangement information 11535 and store into the storing unit 115. The matrix transforming unit 1162 includes a Rowmajor dense matrix generating unit 11621, a Colmajor dense matrix generating unit 11622, a CRS sparse matrix generating unit 11623, and a JDS sparse matrix generating unit 11624.

Figure 2:
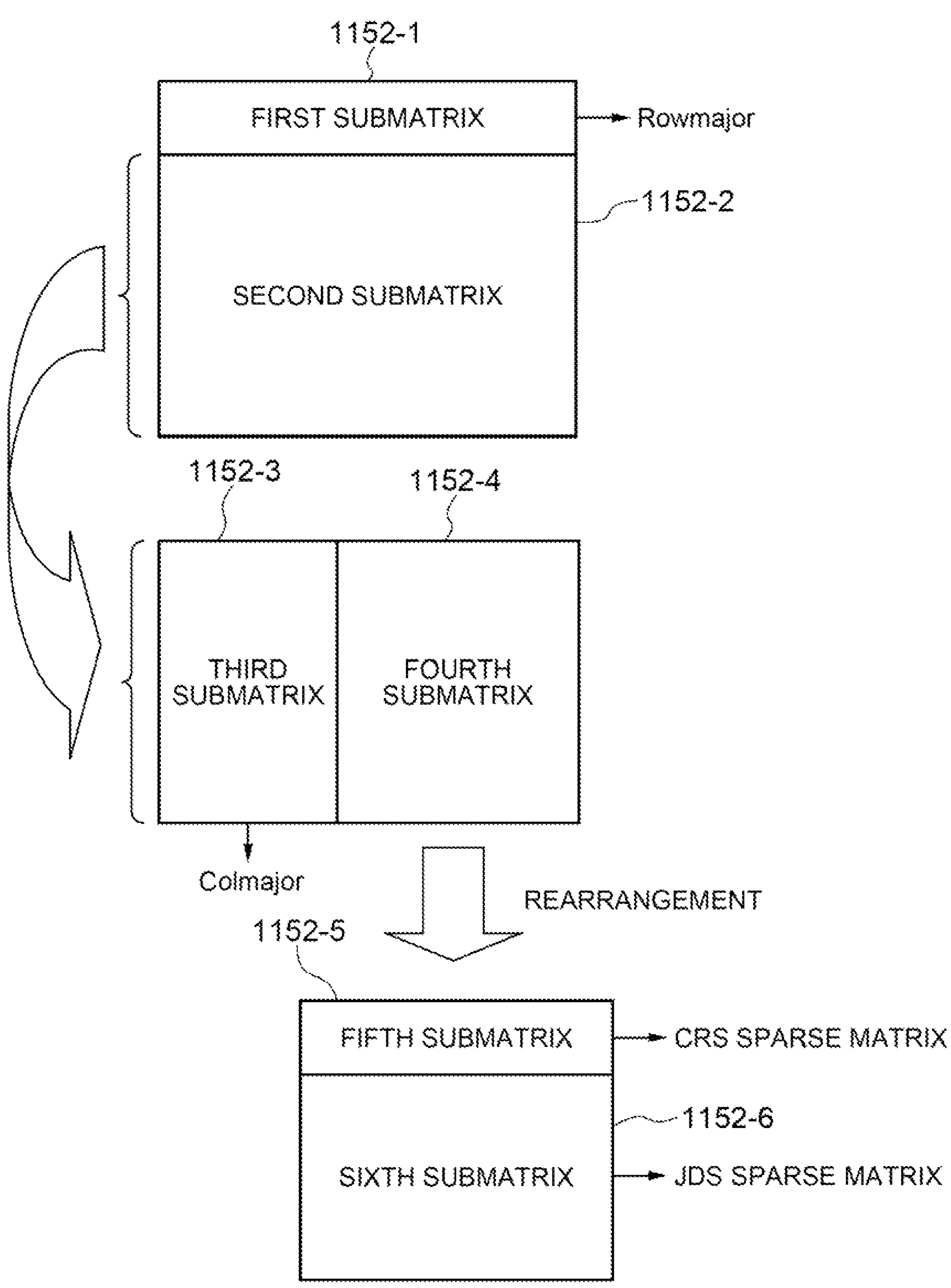
FIG. 2 is a view showing an outline that the information processing apparatus according to the first example embodiment of the present invention transforms a sparse matrix into matrices of a plurality of formats different from each other.

The Rowmajor dense matrix generating unit 11621 is configured to divide the sparse matrix 1152 into a first submatrix 1152-1 including a row in which the number of non-zero elements is a predetermined number (a first threshold value) or more and a second submatrix 1152-2 including the other row as shown in FIG. 2. For example, the Rowmajor dense matrix generating unit 11621 divides the sparse matrix 1152 into the first submatrix 1152-1 and the second submatrix 1152-2 so that rows in which the number of non-zero elements is equal to or more than the first threshold value gather upward. The Rowmajor dense matrix generating unit 11621 is also configured to update the row rearrangement information at the occasion of the abovementioned division. The Rowmajor dense matrix generating unit 11621 is also configured to transform the first submatrix 1152-1 into the Rowmajor dense matrix 11531 of a Row-major order dense matrix format and store into the storing unit 115. The Rowmajor dense matrix 11531 includes a value array, row information, and column information. The Rowmajor dense matrix generating unit 11621 is also configured to transmit the second submatrix 1152-2 to the Colmajor dense matrix generating unit 11622.

The Colmajor dense matrix generating unit 11622 is configured to divide the second submatrix 1152-2 into a third submatrix 1152-3 including a column in which the number of non-zero elements is a predetermined number (a second threshold value) or more and a fourth submatrix 1152-4 including the other column as shown in FIG. 2. For example, the Colmajor dense matrix generating unit 11622 divides the second submatrix 1152-2 into the third submatrix 1152-3 and the fourth submatrix 1152-4 so that columns in which the number of non-zero elements is equal to or more than the second threshold value gather leftward. The Colmajor dense matrix generating unit 11622 is also configured to transform the third submatrix 1152-3 into the Colmajor dense matrix 11532 of a Column-major order dense matrix format. The Colmajor dense matrix generating unit 11622 is also configured to rearrange (sort) the fourth submatrix 1152-4 so that the numbers of the non-zero elements of the respective rows decrease, and transmit the rearranged fourth submatrix 1152-4 to the CRS sparse matrix generating unit 11623. The Colmajor dense matrix generating unit 11622 is also configured to rearrange the Colmajor dense matrix 11532 in the same order as the rearranged fourth submatrix 1152-4, and store the rearranged Colmajor dense matrix 11532 into the storing unit 115. The Colmajor dense matrix 11532 includes a value array, row information, and column information. The Colmajor dense matrix 11532 is also configured to update the row rearrangement information 11535 in accordance with the above rearrangement.

The CRS sparse matrix generating unit 11623 is configured to divide the fourth submatrix 1152-4 into a fifth submatrix 1152-5 including a row in which the number of non-zero elements is a predetermined number (a third threshold value) or more and a sixth submatrix 1152-6 including the other row as shown in FIG. 2. The CRS sparse matrix generating unit 11623 is also configured to transform the fifth submatrix 1152-5 into the CRS sparse matrix 11533 and store into the storing unit 115. The CRS sparse matrix 11533 includes a value array, a column number array, and an offset array. The CRS sparse matrix generating unit 11623 is also configured to transmit the sixth submatrix 1152-6 to the JDS sparse matrix generating unit 11624.

The JDS sparse matrix generating unit 11624 is configured to transform the sixth submatrix 1152-6 into the JDS sparse matrix 11534 and store into the storing unit 115. The JDS sparse matrix 11534 includes a value array, a column number array, and an offset array. Information of rearrangement of rows in the JDS sparse matrix is managed in the row rearrangement information 11535.

The output unit 1163 is configured to retrieve the Rowmajor dense matrix 11531, the Colmajor dense matrix 11532, the CRS sparse matrix 11533, the JDS sparse matrix 11534, and the row rearrangement information 11535 from the storing unit 115, display as the result of transformation of the sparse matrix 1152 on the screen display unit 113, or/and transmit to an external device through the communication I/F unit 111.

Figure 3:
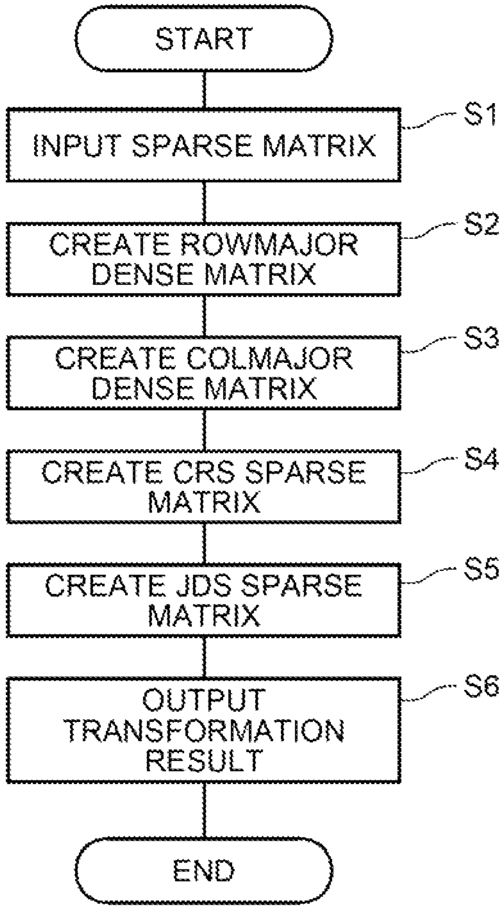
FIG. 3 is a flowchart showing an example of an operation of the information processing apparatus according to the first example embodiment of the present invention.

FIG. 3 is a flowchart showing an example of an operation of the information processing apparatus 100. The operation of the information processing apparatus 100 will be described below with reference to FIG. 3.

Figure 5:
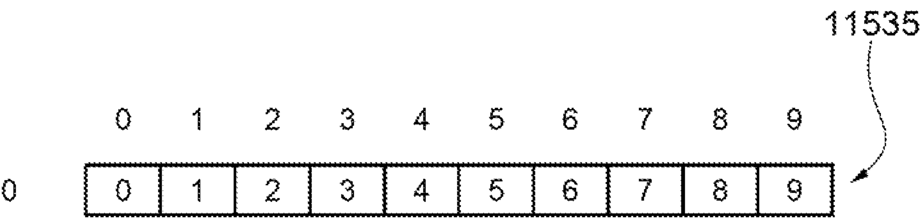
FIG. 5 is a view showing an example of rearrangement information of a row of an initial state in the information processing apparatus according to the first example embodiment of the present invention.

Referring to FIG. 3, first, the input unit 1161 inputs the sparse matrix 1152 through the operation input unit 112 or/and the communication I/F unit 111, and stores the sparse matrix 1152 into the storing unit 115 (step S1). FIG. 4 shows an example of the sparse matrix 1152 input by the input unit 1161. The sparse matrix 1152 in this example is a matrix with ten rows and nine columns. The intersection of a row and a column corresponds to one element, a blank element represents a zero element, and an element in which a value is set represents a non-zero element. Moreover, the input unit 1161 stores the row rearrangement information 11535 of the initial state into the storing unit 115 at step S1. FIG. 5 shows an example of the row rearrangement information 11535 of the initial state.

Figure 6:
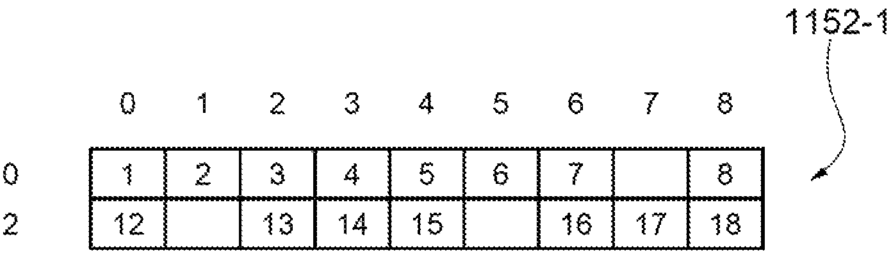
FIG. 6 is a view showing an example of a first submatrix generated by dividing the sparse matrix in the information processing apparatus according to the first example embodiment of the present invention.
Figure 7:
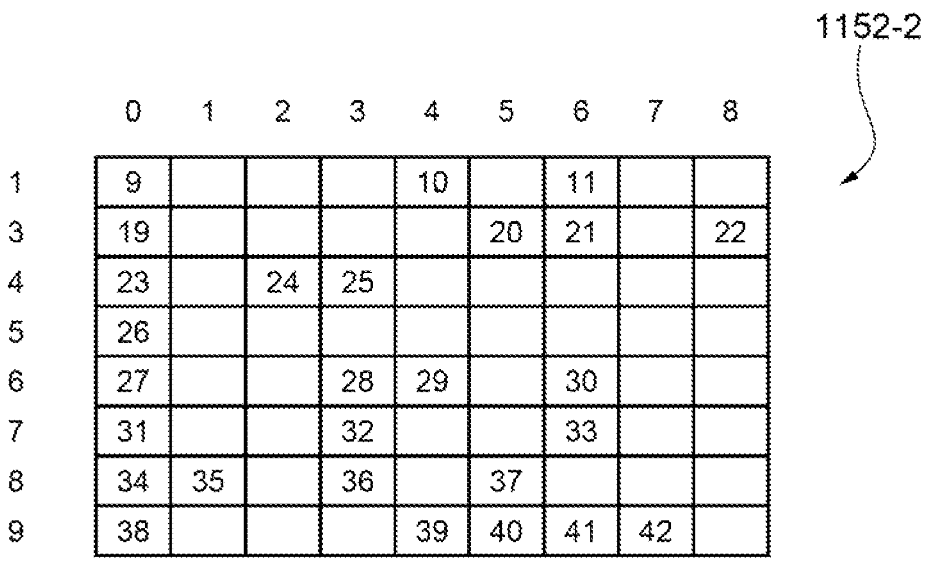
FIG. 7 is a view showing an example of a second submatrix generated by dividing the sparse matrix in the information processing apparatus according to the first example embodiment of the present invention.

Next, the Rowmajor dense matrix generating unit 11621 creates the Rowmajor dense matrix 11531 (step S2). In this processing, first, the Rowmajor dense matrix generating unit 11621 divides the sparse matrix 1152 into the first submatrix 1152-1 including a row in which the number of non-zero elements is equal to or more than a predetermined number (first threshold value) and the second submatrix 1152-2 including the other row. For example, assuming the first threshold value is 7, the Rowmajor dense matrix generating unit 11621 divides the sparse matrix 1152 shown in FIG. 4 into the first submatrix 1152-1 shown in FIG. 6 and the second submatrix 1152-2 shown in FIG. 7. The first submatrix 1152-1 shown in FIG. 6 is composed of the zeroth row and the second row of the sparse matrix 1152. The second submatrix 1152-2 shown in FIG. 7 is composed of the first row and the third to ninth rows of the sparse matrix 1152. Next, the Rowmajor dense matrix generating unit 11621 stores a value 0 into a zero element including no value in the first submatrix 1152-1 to create the Rowmajor dense matrix 11531, and stores the Rowmajor dense matrix 11531 into the storing unit 115. For example, in the case of the first submatrix 1152-1 shown in FIG. 6, the Rowmajor dense matrix generating unit 11621 creates, for example, as shown in FIG. 8, the Rowmajor dense matrix 11531 with two rows and nine columns and stores into the storing unit 115. Moreover, the Rowmajor dense matrix generating unit 11621 updates the row rearrangement information 11535 to "0, 2, 1, 3, 4, 5, 6, 7, 8, 9".

Figure 9:
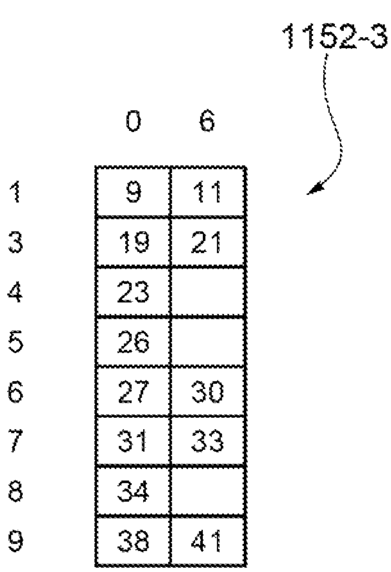
FIG. 9 is a view showing an example of a third submatrix generated by dividing the sparse matrix in the information processing apparatus according to the first example embodiment of the present invention.
Figure 10:
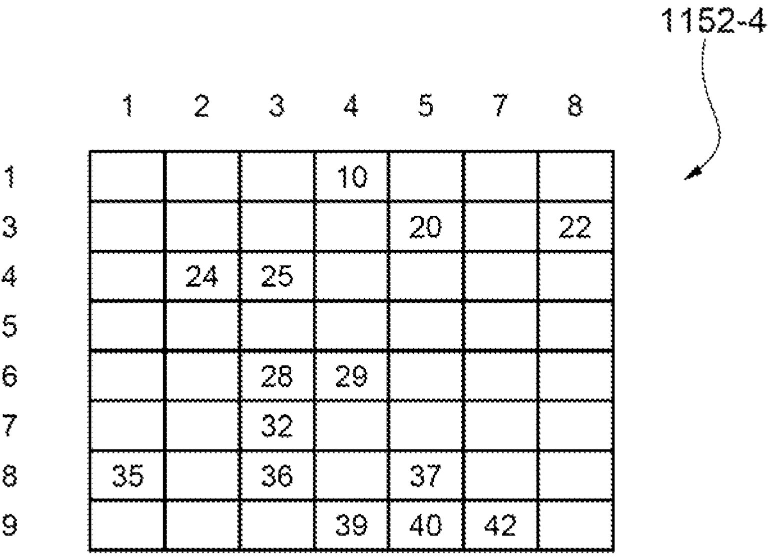
FIG. 10 is a view showing an example of a fourth submatrix generated by dividing the sparse matrix in the information processing apparatus according to the first example embodiment of the present invention.
Figure 11:
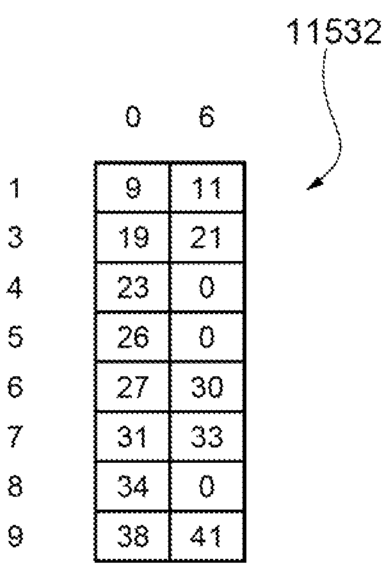
FIG. 11 is a view showing an example of a Colmajor dense matrix generated from the sparse matrix in the information processing apparatus according to the first example embodiment of the present invention.
Figure 12:
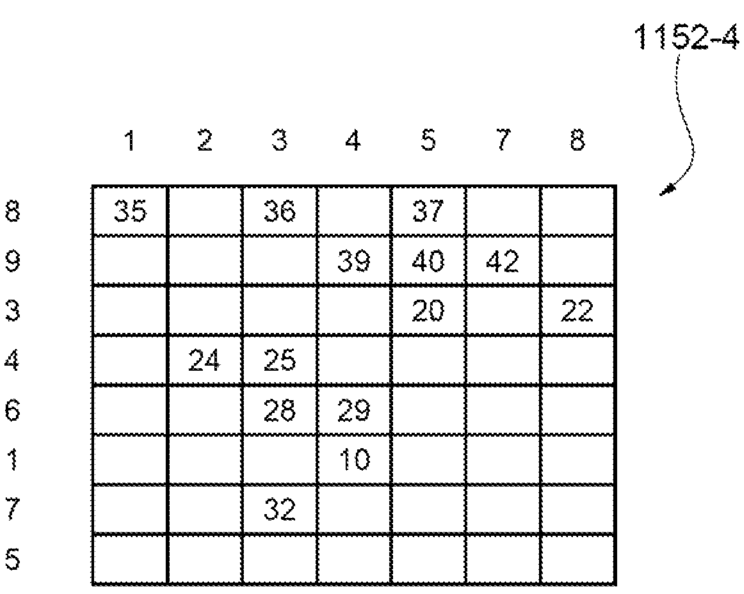
FIG. 12 is a view showing an example of the fourth submatrix rearranged in the information processing apparatus according to the first example embodiment of the present invention.
Figure 13:
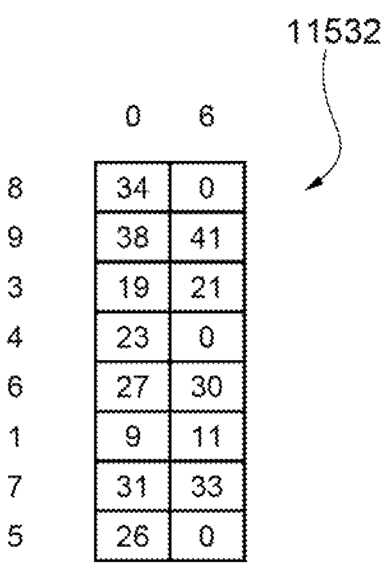
FIG. 13 is a view showing an example of the Colmajor dense matrix rearranged in the information processing apparatus according to the first example embodiment of the present invention.

Next, the Colmajor dense matrix generating unit 11622 creates the Colmajor dense matrix 11532 (step S3). In this processing, first, the Colmajor dense matrix generating unit 11622 divides the second submatrix 1152-2 into the third submatrix 1152-3 including a column in which the number of non-zero elements is equal to or more than a predetermined number (second threshold value) and the fourth submatrix 1152-4 including the other row. For example, assuming the second threshold value is 5, the Colmajor dense matrix generating unit 11622 divides the second submatrix 11522-2 shown in FIG. 7 into the third submatrix 1152-3 with eight rows and two columns shown in FIG. 9 and the fourth submatrix 1152-4 with eight rows×seven columns shown in FIG. 10. The third submatrix 1152-3 shown in FIG. 9 is composed of the zeroth column and the sixth column of the second submatrix 1152-2. The fourth submatrix 1152-4 shown in FIG. 10 is composed of the first to fifth columns and the seventh and eighth columns of the second submatrix 1152-2. Next, the Colmajor dense matrix generating unit 11622 stores a value 0 into a zero element including no value in the third submatrix 1152-3 to create the Colmajor dense matrix 11532. For example, in the case of the third submatrix 1152-3 shown in FIG. 9, the Colmajor dense matrix generating unit 11622 creates the Colmajor dense matrix 11532, for example, as shown in FIG. 11. Next, the Colmajor dense matrix generating unit 11622 rearranges (sorts) the fourth submatrix 1152-4 so that the numbers of the non-zero elements of the respective rows decrease, and transmits the rearranged fourth submatrix 1152-4 to the CRS sparse matrix generating unit 11623. Moreover, the Colmajor dense matrix generating unit 11622 rearranges the Colmajor dense matrix 11532 in the same order as the rearranged fourth submatrix 1152-4, and stores as the rearranged Colmajor dense matrix 11532 into the storing unit 115. For example, in the case of the fourth submatrix 1152-4 shown in FIG. 10 and the Colmajor dense matrix 11532 shown in FIG. 11, the Colmajor dense matrix generating unit 11622 performs row rearrangement to the fourth submatrix 1152-4 shown in FIG. 12 and the Colmajor dense matrix 11532 shown in FIG. 13. Moreover, the Colmajor dense matrix generating unit 11622 updates the row rearrangement information 11535 to "0, 2, 8, 9, 3, 4, 6, 1, 7, 5" in accordance with the above rearrangement.

Figure 14:
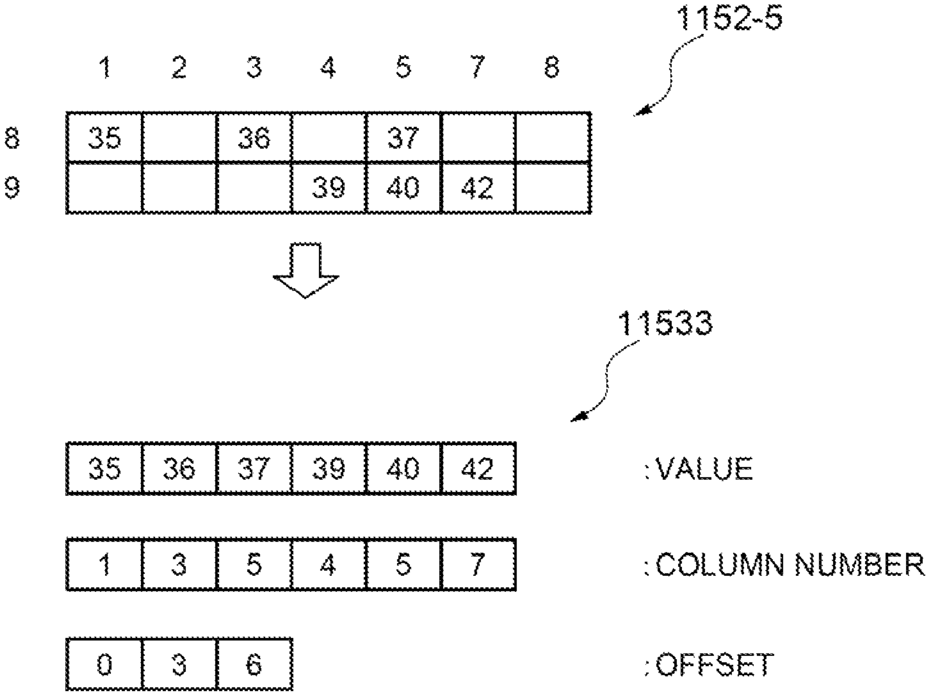
FIG. 14 is a view showing an example of a fifth submatrix generated by dividing the sparse matrix and a CRS sparse matrix generated from the fifth submatrix in the information processing apparatus according to the first example embodiment of the present invention.
Figure 15:
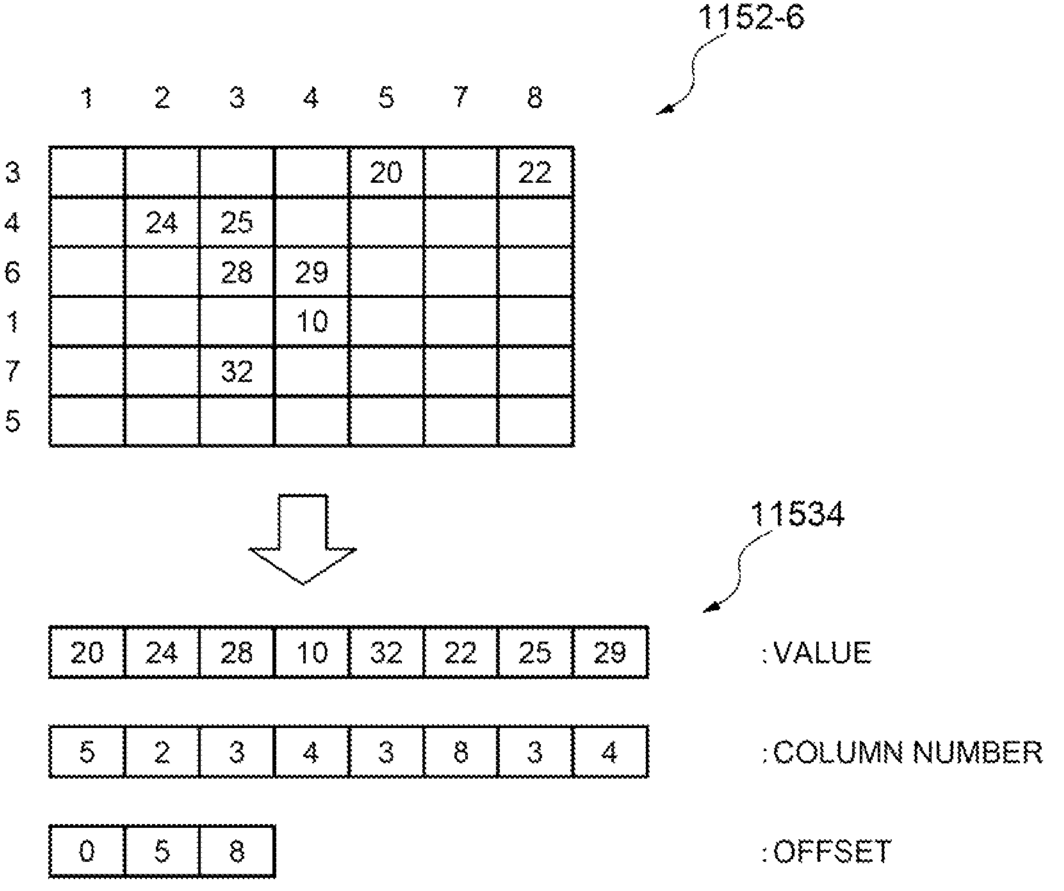
FIG. 15 is a view showing an example of a sixth submatrix generated by dividing the sparse matrix and a JDS sparse matrix generated from the sixth submatrix in the information processing apparatus according to the first example embodiment of the present invention.

Next, the CRS sparse matrix generating unit 11623 creates the CRS sparse matrix 11533 (step S4). In this processing, first, the CRS sparse matrix generating unit 11623 divides the fourth submatrix 1152-4 into the fifth submatrix 1152-5 including a row in which the number of non-zero elements is equal to or more than a predetermined number (third threshold value) and the sixth submatrix 1152-6 including the other row. For example, assuming the third threshold value is 3, the CRS sparse matrix generating unit 11623 divides the fourth matrix 11522-4 shown in FIG. 12 into the fifth submatrix 1152-5 shown on the upper side in FIG. 14 and the sixth submatrix 1152-6 shown on the upper side in FIG. 15. Next, the CRS sparse matrix generating unit 11623 creates the CRS sparse matrix 11533 in which the non-zero elements in the fifth submatrix 1152-5 are stored in the CRS format and stores the CRS sparse matrix 11533 into the storing unit 115. For example, in the case of the fifth submatrix 1152-5 on the upper side in FIG. 14, the CRS sparse matrix generating unit 11623 creates the CRS sparse matrix 11533 composed of a value array, a column number array and an offset array as shown on the lower side in FIG. 14.

Next, the JDS sparse matrix generating unit 11624 creates the JDS sparse matrix 11534 (step S5). In this processing, the JDS sparse matrix generating unit 11624 creates the JDS sparse matrix 11534 from the sixth submatrix 1152-6 and stores into the storing unit 115. For example, in the case of the sixth submatrix 1152-6 on the upper side in FIG. 15, the JDS sparse matrix generating unit 11624 left-justifies the non-zero elements and creates the JDS sparse matrix 11534 composed of a value array, a column number array and an offset array as shown on the lower side in FIG. 15.

In the above procedure, after generation of the CRS sparse matrix from the fourth submatrix 1152-4, the remaining rows are left-justified and the JDS sparse matrix is created. However, the procedure to create the CRS sparse matrix and the JDS sparse matrix from the fourth submatrix 1152-4 is not limited to the above. For example, the procedure may be first left-justifying the non-zero elements of the fourth submatrix 1152-4 shown in FIG. 12, creating the CRS sparse matrix using the rows in which the number of non-zero elements is a predetermined value or more among the rows of the left-justified fourth submatrix 1152-4, and creating the JDS sparse matrix using the remaining rows.

Next, the output unit 1163 retrieves the Rowmajor dense matrix 11531, the Colmajor dense matrix 11532, the CRS sparse matrix 11533, the JDS sparse matrix 11534, and the row rearrangement information 11535 from the storing unit 115, displays as the result of transformation of the sparse matrix 1152 on the screen display unit 113, or/and transmits to an external device through the communication I/F unit 111 (step S6)

As described above, according to this example embodiment, it is possible to store a row and a column including many non-zero elements of an input sparse matrix as a Rowmajor dense matrix and a Colmajor dense matrix without uselessly dividing, and it is also possible to divide the remaining sparse submatrix into a CRS sparse matrix and a JDS sparse matrix and store. With this, it becomes possible to transform a sparse matrix into a matrices of a plurality of formats that can be multiplied by a vector to obtain products at high speeds.

Second Example Embodiment

Figure 16:
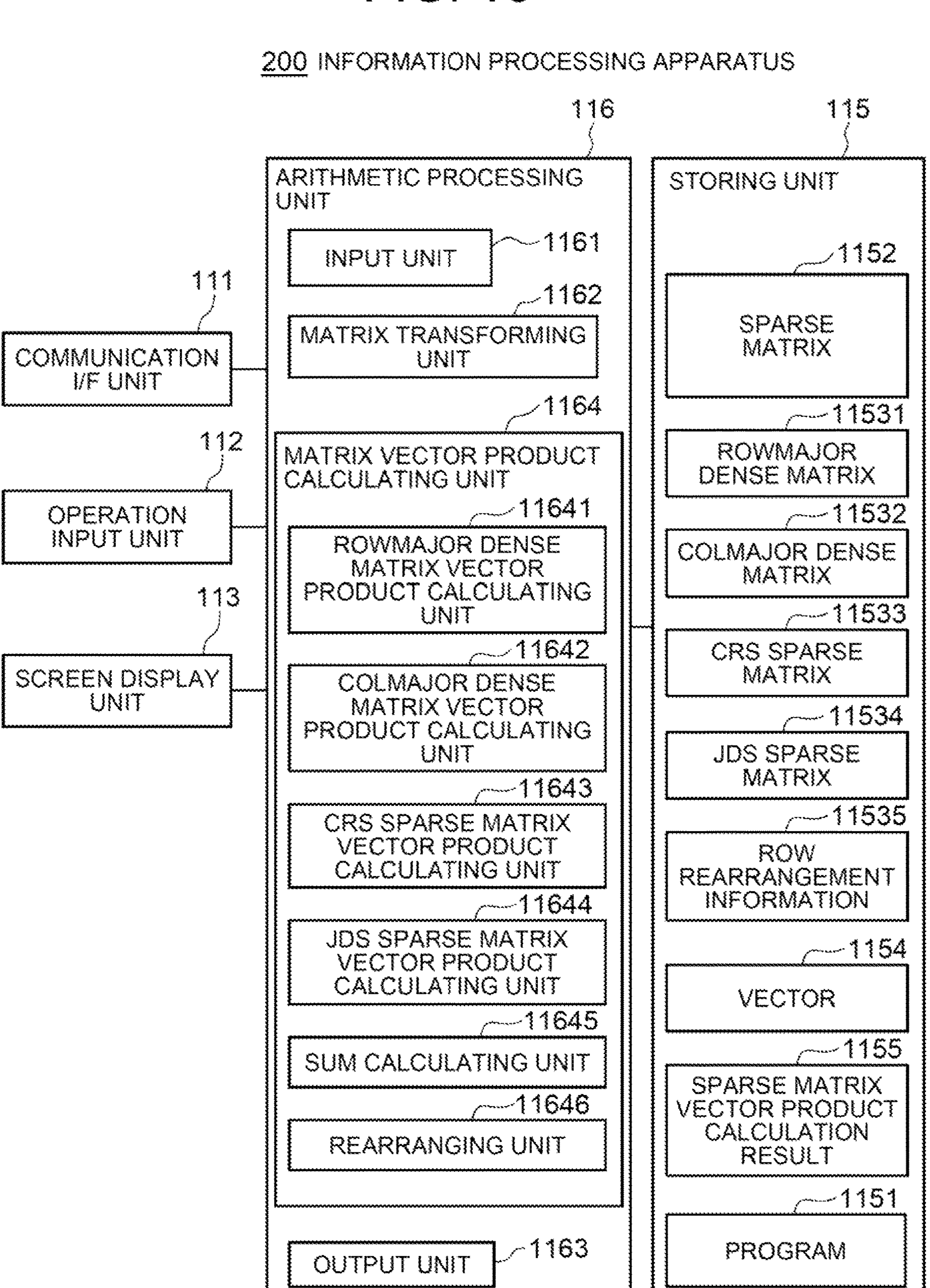
FIG. 16 is a block diagram of an information processing apparatus according to a second example embodiment of the present invention.

FIG. 16 is a block diagram of an information processing apparatus 200 according to a second example embodiment of the present invention. The information processing apparatus 200 has a function to transform a sparse matrix into a plurality of submatrices that can be multiplied by a vector to obtain products at high speeds as with the information processing apparatus 100 shown in FIG. 1, and furthermore, has a function to obtain the product of the sparse matrix and a vector using the submatrices after transformation. Referring to FIG. 16, as compared with the information processing apparatus 100 shown in FIG. 1, the information processing apparatus 200 is different in being configured such that the storing unit 115 further stores therein a vector 1154 and a sparse matrix vector product calculation result 1155 and the arithmetic processing unit 116 further includes a matrix vector product calculating unit 1164, and other than the above, is configured in the same manner as the information processing apparatus 100.

Figure 17:
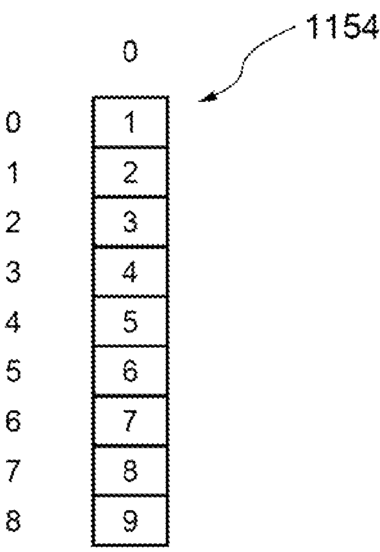
FIG. 17 is a view showing an example of a vector that can be multiplied by the sparse matrix to obtain a product in the information processing apparatus according to the second example embodiment of the present invention.

The vector 1154 is a vector that can be multiplied by a sparse matrix to obtain a product. FIG. 17 shows an example of the vector 1154. The vector 1154 in this example is a vector with nine rows and one column. The sparse matrix vector product calculation result 1155 is the result of calculation of the product of the sparse matrix 1152 and the vector 1154.

The matrix vector product calculating unit 1164 is configured to calculate the product of the sparse matrix 1152 and the vector 1154. The matrix vector product calculating unit 1164 includes a Rowmajor dense matrix vector product calculating unit 11641, a Colmajor dense matrix vector product calculating unit 11642, a CRS sparse matrix vector product calculating unit 11643, a JDS sparse matrix vector product calculating unit 11644, a sum calculating unit 11645, and a rearranging unit 11646.

The Rowmajor dense matrix vector product calculating unit 11641 is configured to calculate the product of the Rowmajor dense matrix 11531 and the vector 1154. The Colmajor dense matrix vector product calculating unit 11642 is configured to calculate the product of the Colmajor dense matrix 11532 and the vector 1154. The CRS sparse matrix vector product calculating unit 11643 is configured to calculate the product of the CRS sparse matrix 11533 and the vector 1154. The JDS sparse matrix vector product calculating unit 11644 is configured to calculate the product of the JDS sparse matrix 11534 and the vector 1154. The sum calculating unit 11645 is configured to add the products calculated by the Rowmajor dense matrix vector product calculating unit 11641, the Colmajor dense matrix vector product calculating unit 11642, the CRS sparse matrix vector product calculating unit 11643 and the JDS sparse matrix vector product calculating unit 11644 to each other on the same rows. The rearranging unit 11646 is configured to perform rearrangement of the rows of the result of the calculation by the sum calculating unit 11645.

Figure 18:
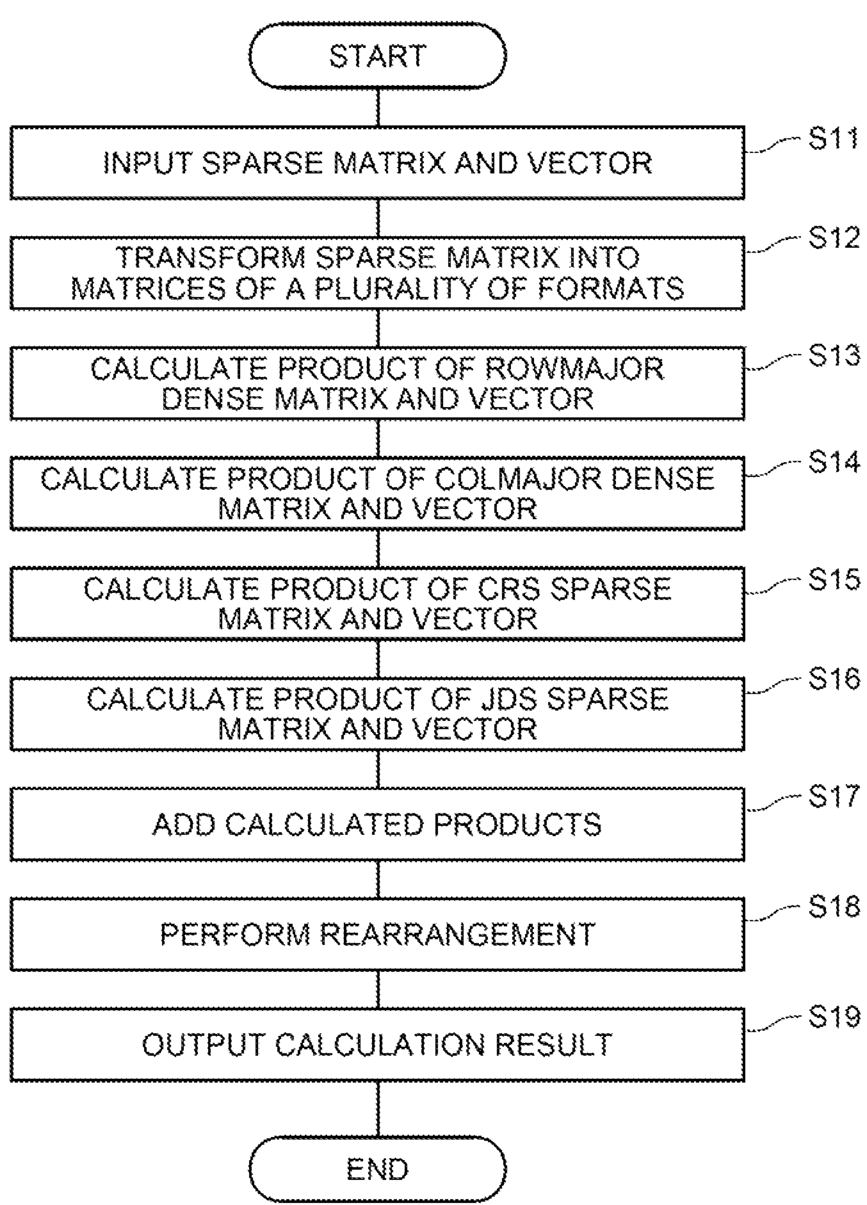
FIG. 18 is a flowchart showing an example of an operation of the information processing apparatus according to the second example embodiment of the present invention.

FIG. 18 is a flowchart showing an example of an operation of the information processing apparatus 200. The operation of the information processing apparatus 200 will be described below with reference to FIG. 18.

Referring to FIG. 18, first, the input unit 1161 inputs the sparse matrix 1152 and the vector 1154 through the operation input unit 112 or/and the communication I/F unit 111, and stores into the storing unit 115 (step S11).

Next, the matrix transforming unit 1162 retrieves the sparse matrix 1152 from the storing unit 115, performs the same matrix transformation processing as in the information processing apparatus 100 according to the first example embodiment to generate the Rowmajor dense matrix 11531, the Colmajor dense matrix 11532, the CRS sparse matrix 11533, the JDS sparse matrix 11534 and the row rearrangement information 11535, and stores into the storing unit 115 (step S12).

Figure 19:
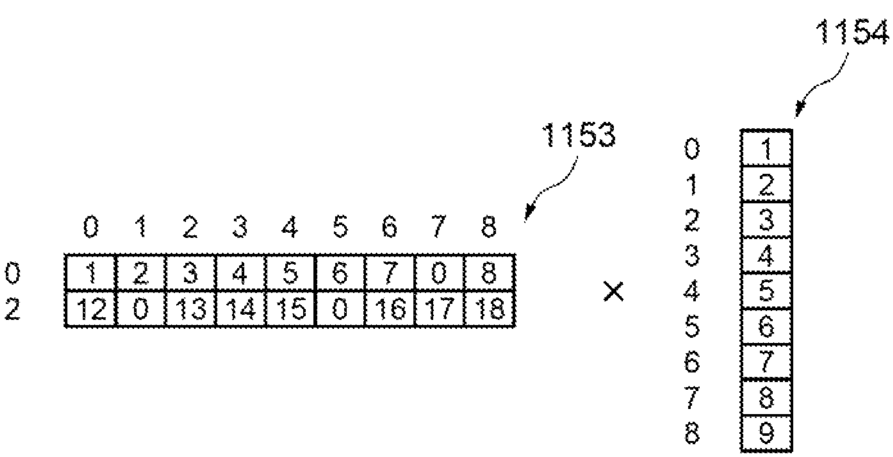
FIG. 19 is a view showing an example of calculation of the product of a Rowmajor dense matrix and the vector.

Next, the Rowmajor dense matrix vector product calculating unit 11641 calculates the product of the Rowmajor dense matrix 11531 and the vector 1154 (step S13). FIG. 19 shows the result of calculation of the product of the Rowmajor dense matrix 11531 shown in FIG. 8 and the vector 1154 shown in FIG. 17.

Figure 20:
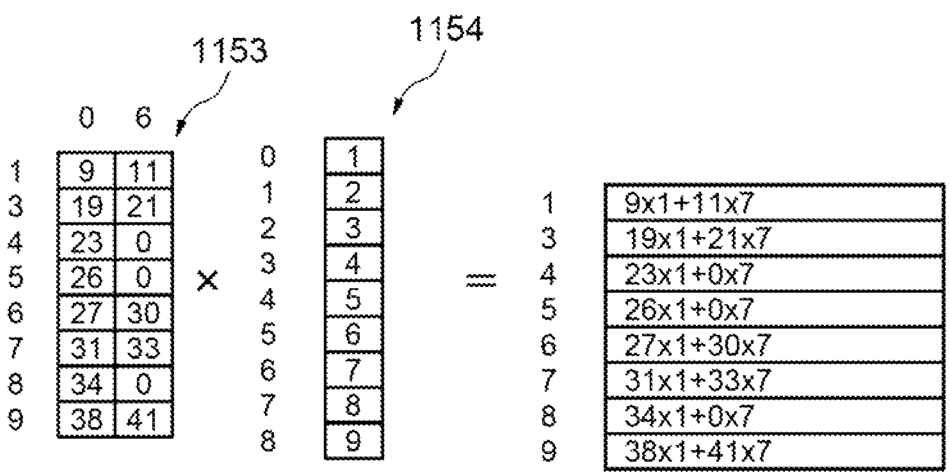
FIG. 20 is a view showing an example of calculation of the product of a Colmajor dense matrix and the vector.

Next, the Colmajor dense matrix vector product calculating unit 11642 calculates the product of the Colmajor dense matrix 11532 and the vector 1154 (step S14). FIG. 20 shows the result of calculation of the product of the Colmajor dense matrix 11532 shown in FIG. 11 and the vector 1154 shown in FIG. 17.

Figure 21:
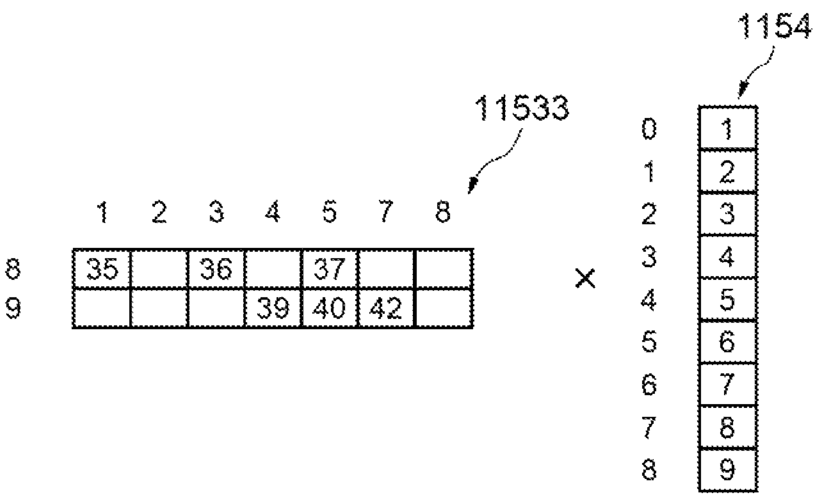
FIG. 21 is a view showing an example of calculation of the product of a CRS sparse matrix and the vector.

Next, the CRS sparse matrix vector product calculating unit 11643 calculates the product of the CRS sparse matrix 11533 and the vector 1154 (step S15). FIG. 21 shows the result of calculation of the product of the CRS sparse matrix 11533 shown in FIG. 14 and the vector 1154 shown in FIG. 17.

Figure 22:
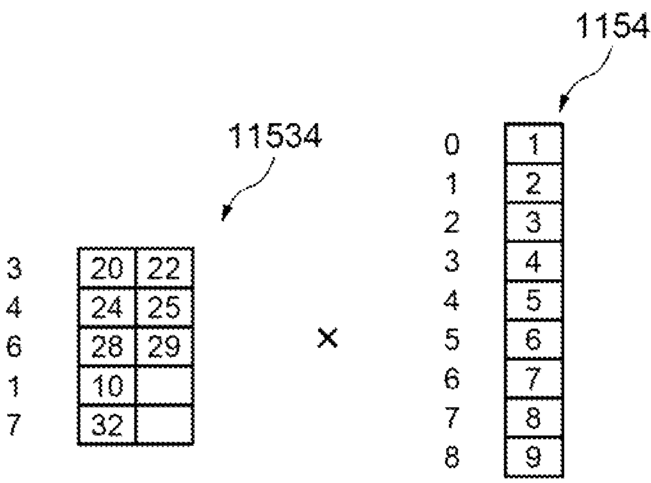
FIG. 22 is a view showing an example of calculation of the product of a JDS sparse matrix and the vector.
Figure 22:
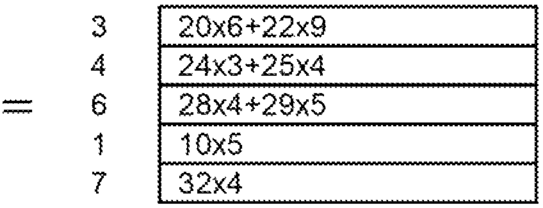

Next, the JDS sparse matrix vector product calculating unit 11644 calculates the product of the JDS sparse matrix 11534 and the vector 1154 (step S16). FIG. 22 shows the result of calculation of the product of the JDS sparse matrix 11534 shown in FIG. 15 and the vector 1154.

Next, the sum calculating unit 11645 adds the products calculated by the Rowmajor dense matrix vector product calculating unit 11641, the Colmajor dense matrix vector product calculating unit 11642, the CRS sparse matrix vector product calculating unit 11643 and the JDS sparse matrix vector product calculating unit 11644 to each other on the same rows (step S17). As is apparent from a comparison between FIG. 23, which shows the result of the calculation of the product of the sparse matrix with ten rows and nine columns shown in FIG. 4 and the vector 1154 with nine rows and one column shown in FIG. 17, and FIGS. 19 to 22, the results of the calculations by the Colmajor dense matrix vector product calculating unit 11642, the CRS sparse matrix vector product calculating unit 11643 and the JDS sparse matrix vector product calculating unit 11644 represent the partial products of the rows of the sparse matrix vector product calculation result. Therefore, the sum calculating unit 11645 calculates the product of all the rows by adding the products calculated by the Colmajor dense matrix vector product calculating unit 11642, the CRS sparse matrix vector product calculating unit 11643 and the JDS sparse matrix vector product calculating unit 11644 to each other on the same rows.

Next, the rearranging unit 11646 performs rearrangement of the rows of the result of the calculation by the sum calculating unit 11645 based on the row rearrangement information 11535 (step S18). That is to say, since the arrangement of the rows of the sparse matrix vector product calculation result calculated by the sum calculating unit 11646 is different from the arrangement of the rows of the sparse matrix 1152, the rearranging unit 11646 performs rearrangement so that it becomes the same as the arrangement of the rows of the sparse matrix 1152 based on the row rearrangement information 1153.

Next, the output unit 1163 retrieves the sparse matrix vector product calculation result 1155 from the storing unit 115, displays as the result of calculation of the sparse matrix 1152 and the vector 1154 on the screen display unit 113 or/and transmits to an external device through the communication I/F unit 111 (step S19).

As described above, according to this example embodiment, the product of the sparse matrix 1152 and the vector 1154 can be calculated at high speeds. The reason is that rows and columns including many non-zero elements in the sparse matrix 1152 are stored as the Rowmajor dense matrix 11531 and the Colmajor dense matrix 11532 without being divided uselessly, the remaining sparse submatrix is divided into the CRS sparse matrix 11533 and the JDS sparse matrix and stored, the product of the Rowmajor dense matrix 11531 and the vector 1154, the product of the Colmajor dense matrix 11532 and the vector 1154, the product of the CRS sparse matrix 11533 and the vector 1154 and the product of the JDS sparse matrix 11534 and the vector 1154 are calculated, respectively, the sum of the products per row is obtained, and finally, the rearrangement of the rows are performed.

The reason why the product of the Rowmajor dense matrix 11531 and the vector 1154 and the product of the Colmajor dense matrix 11532 and the vector 1154 can be calculated at high speeds is that the arithmetic processing unit 116 can acquire data required for the calculation from the storing unit 115 in a small number of transfer cycles. For example, assuming that the amount of data that can be acquired by the arithmetic processing unit 116 from the storing unit 115 in one transfer cycle is for three elements, a total of 18 elements of the Rowmajor dense matrix 11531 in FIG. 19 can be acquired in six transfer cycles, and a total of 9 elements of the vector 1154 can be acquired in three transfer cycles. Then, out of the acquired 27 elements, only one is a useless zero element. From this, the Rowmajor dense matrix vector product calculation can be performed at high speeds. Further, a total of 16 elements of the Colmajor dense matrix 11532 in FIG. 20 can be acquired in six transfer cycles, and a total of 9 elements of the vector 1154 can be acquired in three transfer cycles. Then, out of the acquired 25 elements, only three elements are useless zero elements. From this, the Colmajor dense matrix vector product calculation can be performed at high speeds.

The reason why the product of the CRS sparse matrix 11533 and the vector 1154 and the product of the JDS sparse matrix 11534 and the vector 1154 can be calculated at high speeds is that there is no useless calculation as compared with calculation of the product of a sparse matrix and a vector.

A program example (a pseudo code example) that realizes the matrix vector product calculating unit 1164 will be described below. As the programming language, the C language is used. However, it is needless to say that the matrix vector product calculating unit 1164 can be realized by a programming language other than the C language.

FIG. 24 shows an example of a program of the Rowmajor dense matrix vector product calculating unit 11641 in the matrix vector product calculating unit 1164. In FIG. 24, Vai[ ], nlow, and ncol represent the value array, the number of rows, and the number of columns of the Rowmajor dense matrix 11531, respectively, U[ ] represents the value array of the vector 1154, and P'[ ] represents the value array of a calculation result vector.

FIG. 25 shows an example of a program of the Colmajor dense matrix vector product calculating unit 11642 in the matrix vector product calculating unit 1164. In FIG. 25, Val[ ], nlow, and ncol represent the value array, the number of rows, and the number of columns of the Colmajor dense matrix 11532, respectively, U[ ] represents the value array of the vector 1154, and P'[ ] represents the value array of a calculation result vector.

FIG. 26 shows an example of a program of the CRS sparse matrix vector product calculating unit 11643 in the matrix vector product calculating unit 1164. In FIG. 26, Val[ ], Col[ ], and off[ ] represent the value array, the column number array, and the values of elements of the offset array of the CRS sparse matrix 11533, respectively, nrow represents the number of rows of the CRS sparse matrix 11533, U[ ] represents the value array of the vector 1154, and P'[ ] represents the value array of a calculation result vector.

FIG. 27 shows an example of a program of the JDS sparse matrix vector product calculating unit 11644 in the matrix vector product calculating unit 1164. In FIG. 27, Val[ ], Col[ ], and off[ ] represent the value array, the column number array, and the values of elements of the offset array of the JDS sparse matrix 11534, respectively, colmax represents the maximum number of columns of the JDS sparse matrix 11534, U[ ] represents the value array of the vector 1154, and P'[ ] represents the value array of a calculation result vector.

FIG. 28 shows an example of a program of the rearranging unit 11646 in the matrix vector product calculating unit 1164. In FIG. 28, Row[ ] represents the value array of the row rearrangement information 11535, nrow represents the number of rows of the sparse matrix 1152, P'[ ] represents the value array of a calculation result vector, and P[ ] represents the value array of a sparse matrix vector product calculation result.

Among the programs shown in FIGS. 24 to 28, the program shown in FIG. 24 is first executed, the programs shown in FIGS. 25, 26 and 27 are next executed in this order, and the program shown in FIG. 28 is finally executed. At this time, the value array P'[ ] of a calculation result vector operates so as to be inherited between the programs. For example, in a case where 9×1+11×7 is stored in an array P'[1] at a time when execution of the program shown in FIG. 25 ends, 10×5 is further added to P'[1] in the program shown in FIG. 27. Such an operation corresponds to the operation of the sum calculating unit 11645. Therefore, in the above program example, a dedicated program for the sum calculating unit 11645 is not provided. However, in a case where the value array P'[ ] of a calculation result vector is provided independently for each of the calculating units 11641 to 11644, there is a need to program the sum calculating unit 11645 for obtaining the sum in row units after executing them.

As described above, according to this example embodiment, the product of a sparse matrix and a vector can be calculated at high speeds. The reason is that the result of sparse matrix vector product calculation is generated by transforming a sparse matrix into a plurality of submatrices that can be multiplied by a vector to obtain products at high speeds, that is, a Rowmajor dense matrix, a Colmajor dense matrix, a CRS sparse matrix and a JDS sparse matrix, calculating the products of the submatrices and the vector individually, and adding the results of the calculations to each other.

Third Example Embodiment

Figure 29:
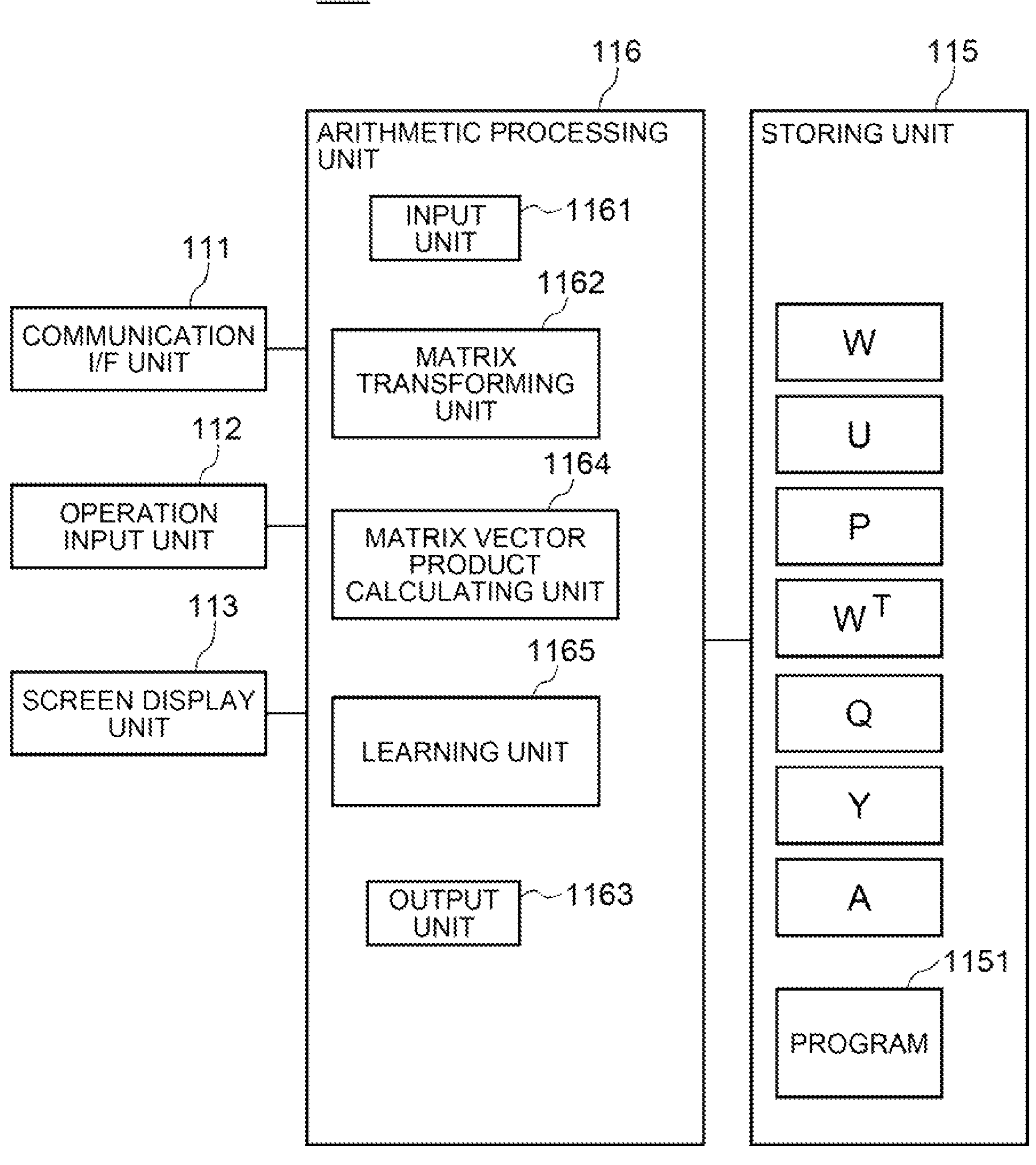
FIG. 29 is a block diagram of an information processing apparatus according to a third example embodiment of the present invention.

FIG. 29 is a block diagram of an information processing apparatus 300 according to a third example embodiment of the present invention. The information processing apparatus 300 includes a function of transforming a sparse matrix into a plurality of submatrices that can be multiplied by a vector at high speeds to obtain products and a function of obtaining the product of the sparse matrix and the vector using the submatrices after transformation as with the information processing apparatus 200 shown in FIG. 16, and also includes a function of performing statistical machine learning. Referring to FIG. 29, as compared with the information processing apparatus 200 shown in FIG. 16, the information processing apparatus 300 is different in that the storing unit 115 is configured to store therein data W, U, P, $W^T$, Q, Y and A and the arithmetic processing unit 116 further includes a learning unit 1165, and other than the above, is configured in the same manner as the information processing apparatus 200.

Figure 30:
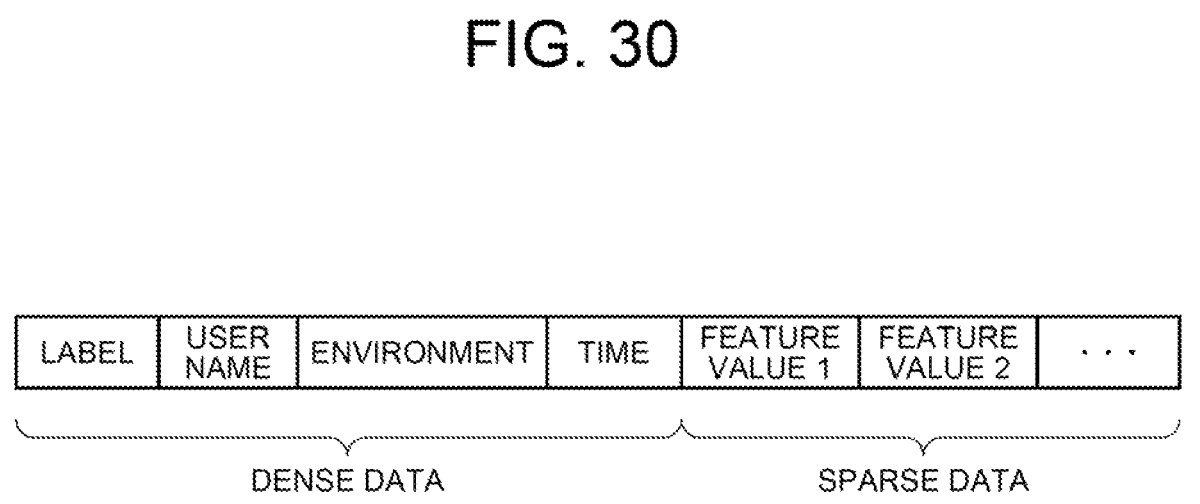

The data W is input data for statistical machine learning. The data W is a sparse matrix in which many of its elements are zero elements that are unnecessary for processing, similar to the sparse matrix 1152 shown in FIG. 16. Moreover, the data W includes a row and a column in which many non-zero elements gather as part of the matrix. An example of such data W is a sparse matrix in which one row includes information of one user as shown in FIG. 30. The user information shown in FIG. 30 includes label, user name, environment, time, feature value 1, feature value 2, . . . , and the first four items (label, user name, environment, and time) are dense data that all user information includes. The latter items of feature values are sparse data as a whole, but there is a case where most users have a specific feature value and a case where a specific user has a large amount of feature values. In a case where most users have a specific feature value, a column for the item of the specific feature value becomes dense data. In a case where a specific user has a large amount of feature values, a row for the user becomes dense data.

The data $W^T$ is a transposed matrix of the data W. the data A is training data. The data U is a vector composed of a set of parameters of a model to be learned. The data P is the product of the data W and the data U. The data Q is a vector calculated from the difference between the data P and the training data A. The data Y is the product of the data $W^T$ and the data Q.

Figure 31:
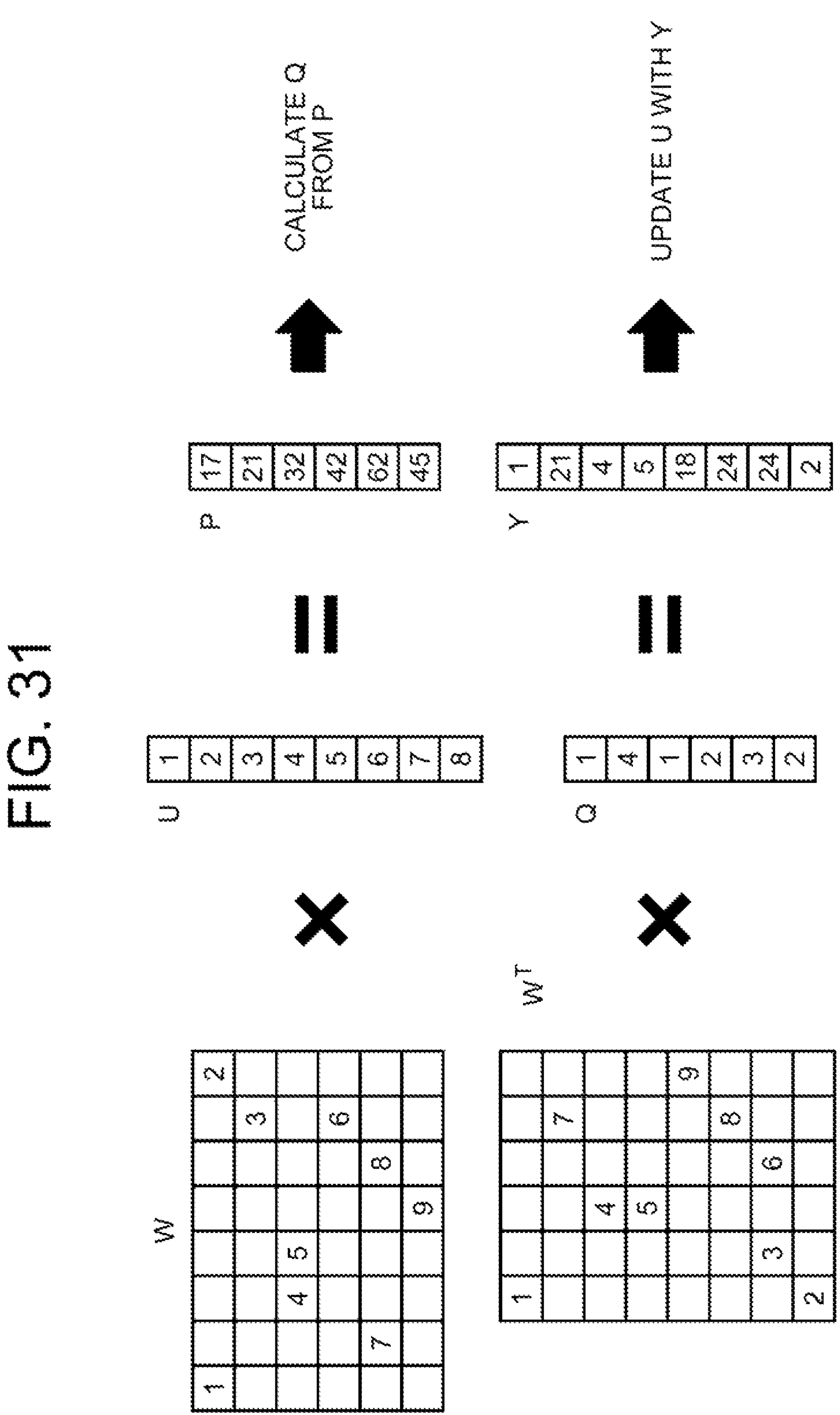
FIG. 31 is a view showing an example of calculation repeatedly executed in the information processing apparatus according to the third example embodiment of the present invention.

The learning unit 1165 is configured to perform statistical machine learning using the data W, U, P, $W^T$, Q, Y, and A. As statistical machine learning, logistic regression (LR) is used in this embodiment. In the LR, in the course of execution thereof, the calculation as shown in FIG. 31 is repeatedly executed many times and the final data U is obtained.

Figure 32:
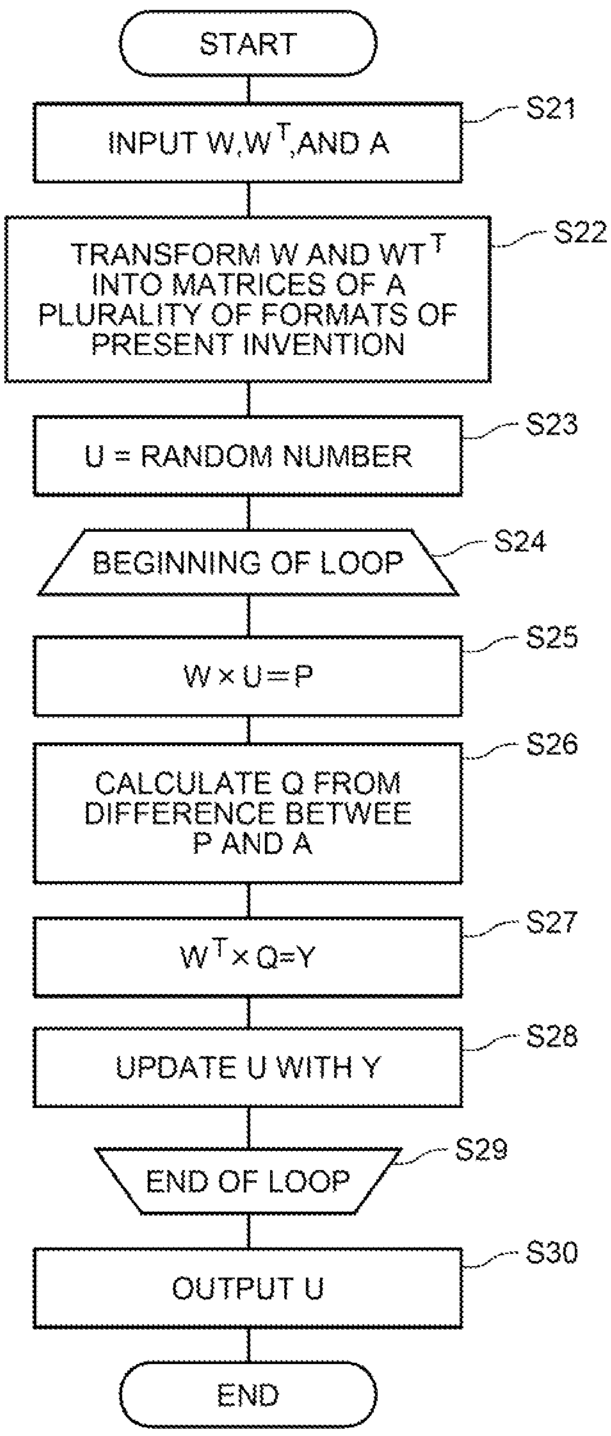
FIG. 32 is a flowchart showing an example of an operation of the information processing apparatus according to the third example embodiment of the present invention.

FIG. 32 is a flowchart showing an example of an operation of the information processing apparatus 300. The operation of the information processing apparatus 300 will be described below with reference to FIG. 32.

Referring to FIG. 32, first, the input unit 1161 inputs the data W, $W^T$ and A through the operation input unit 112 or/and the communication I/F unit 111, and stores into the storing unit 115 (step S21).

Next, the matrix transforming unit 1162 retrieves the data W and $W^T$ from the storing unit 115, performs matrix transformation processing in the same manner as the information processing apparatus 200 according to the second example embodiment to transform each of the data W and $W^T$ into a plurality of submatrices of mutually different formats, and stores into the storing unit 115 (step S22). That is to say, the matrix transforming unit 1162 transforms the data W into a Rowmajor dense matrix, a Colmajor dense matrix, a CRS sparse matrix, and a JDS sparse matrix. The matrix transforming unit 1162 also transforms the data $W^T$ into a Rowmajor dense matrix, a Colmajor dense matrix, a CRS sparse matrix, and a JDS sparse matrix.

Next, the learning unit 1165 sets random numbers to the data U, and stores into the storing unit 115 (step S23).

Next, the learning unit 1165 repeats steps S25 to S28 until a predetermined condition is established (steps S24, S29). An example of the predetermined condition is a condition that the number of repetitions reaches a predetermined number of times, but is not limited thereto.

At step S25, the learning unit 1165 uses the matrix vector product calculating unit 1164 to calculate the product of the data W and the data U, and stores the data P that is the result of the calculation into the storing unit 115. In the calculation of the product of the data W and the data U, the matrix vector product calculating unit 1164 individually calculates the product of each of the Rowmajor dense matrix, Colmajor dense matrix, CRS sparse matrix and JDS sparse matrix that are generated from the data W and the data U, and adds the products to each other to calculate the data P.

Further, at step S26, the learning unit 1165 calculates the data Q from the difference between the calculated data P and the training data A, and stores the data Q into the storing unit 115.

Further, at step S27, the learning unit 1165 uses the matrix vector product calculating unit 1164 to calculate the product of the data $W^T$ and the data Q, and stores the data Y that is the result of the calculation into the storing unit 115. In the calculation of the product of the data $W^T$ and the data Q, the matrix vector product calculating unit 1164 individually calculates the product of each of the Rowmajor dense matrix, Colmajor dense matrix, CRS sparse matrix and JDS sparse matrix that are generated from the data $W^T$ and the data Q, and adds the products to each other to calculate the data Y.

Further, at step S28, the learning unit 1165 updates the data U with the calculated data Y.

Next, the output unit 1163 retrieves the data U from the storing unit 115, displays as a learning result (the parameters of a learned model) on the screen display unit 113, or/and transmits to an external device through the communication unit 111.

As described above, according to this example embodiment, it is possible to speed up statistical machine learning. The reason is that sparse matrix vector product calculation required to be repeatedly executed many times in statistical machine learning is speeded up by the method of the present invention.

Fourth Example Embodiment

Next, a fourth example embodiment of the present invention will be described with reference to the drawings.

Figure 33:
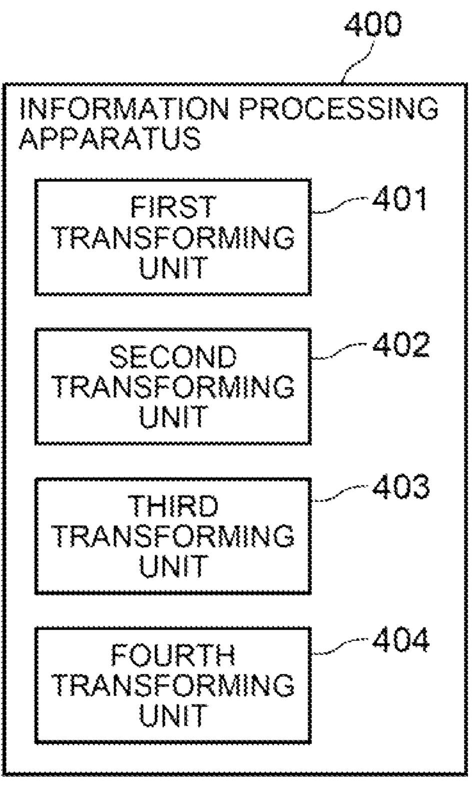
FIG. 33 is a block diagram of an information processing apparatus according to a fourth example embodiment of the present invention.

FIG. 33 is a block diagram of an information processing apparatus 400 according to the fourth example embodiment. Referring to FIG. 33, the information processing apparatus 400 includes a first transforming unit 401, a second transforming unit 402, a third transforming unit 403, and a fourth transforming unit 404.

The first transforming unit 401 is configured to divide a sparse matrix into a first submatrix including a row in which the number of non-zero elements is a predetermined number or more and a second submatrix including the other row and transform the first submatrix into a first matrix of a row-major order dense matrix format. The first transforming unit 401 can be configured by, for example, the Rowmajor dense matrix generating unit 11621, but is not limited thereto.

The second transforming unit 402 is configured to divide the second submatrix into a third submatrix including a column in which the number of non-zero elements is a predetermined number or more and a fourth submatrix including the other column and transform the third submatrix into a second matrix of a column-major order dense matrix format. The second transforming unit 402 can be configured by, for example, the Colmajor dense matrix generating unit 11622, but is not limited thereto.

The third transforming unit 403 is configured to divide the fourth submatrix into a fifth submatrix and a sixth submatrix and transform the fifth submatrix into a third matrix of a row-major order sparse matrix compression format. The third transforming unit 403 can be configured by, for example, the CRS submatrix generating unit 11623 shown in FIG. 1, but is not limited thereto.

The fourth transforming unit 404 is configured to transform the sixth submatrix into a fourth matrix of a column-major order sparse matrix compression format. The fourth transforming unit 404 can be configured by, for example, the JDS sparse matrix generating unit 11624 shown in FIG. 1, but is not limited thereto.

The information processing apparatus 400 thus configured operates in the following manner. The first transforming unit 401 divides a sparse matrix into a first submatrix including a row in which the number of non-zero elements is a predetermined number or more and a second submatrix including the other row and transforms the first submatrix into a first matrix of a row-major order dense matrix format. Next, the second transforming unit 402 divides the second submatrix into a third submatrix including a column in which the number of non-zero elements is a predetermined number or more and a fourth submatrix composed of the other column and transforms the third submatrix into a second matrix of a column-major order dense matrix format. Next, the third transforming unit 403 divides the fourth submatrix into a fifth submatrix and a sixth submatrix and transforms the fifth submatrix into a third matrix of a row-major order sparse matrix compression format. Next, the fourth transforming unit 404 transforms the sixth submatrix into a fourth matrix of a column-major order sparse matrix compression format.

With the information processing apparatus 400 configured and operating in the above manner, it is possible to calculate a matrix vector product at high speeds on a sparse matrix in which a row and a column including many non-zero elements exist in part of the matrix. The reason is that it is possible to retain as a first matrix of a row-major order dense matrix format and a second matrix of a column-major order dense matrix format without uselessly dividing a row and a column including many non-zero elements in an input sparse matrix, and it is possible to retain the remaining sparse submatrix in a sparse matrix compression format.

Although the present invention has been described above with reference to the example embodiments, the present invention is not limited to the example embodiments. The configurations and details of the present invention can be changed in various manners that can be understood by one skilled in the art within the scope of the present invention. For example, the following configurations are also included in the present invention.

In the first to third example embodiments, the matrix transforming unit 1162 divides the fourth submatrix 1152-4 into the fifth submatrix 1152-5 including a row in which the number of non-zero elements is a predetermined number or more and the sixth submatrix 1152-6 including the other row, stores the non-zero elements of the fifth submatrix 1152-5 in the CRS format, and stores the sixth submatrix 1152-6 in the JDS format. However, the matrix transforming unit 1162 may be configured to left justify the non-zero elements of the fourth submatrix 1152-4, store a submatrix for a column in which the number of non-zero elements is a predetermined number or more among the columns of the left-justified matrix in the JDS format, and store a submatrix for the other column of the left-justified matrix in the CRS format.

Further, in the first to third example embodiment, the matrix transforming unit 1162 uses the CRS format and the JDS format as a sparse matrix compression format for storing the non-zero elements of the fourth submatrix 1152-4. However, the column transforming unit 1162 may use another sparse matrix compression format for storing the elements of a matrix in row-major order instead of the CRS, and may use another sparse matrix compression format for storing the elements of the matrix in column-major order instead of the JDS format.

Further, in the third example embodiment, the present invention is applied to sparse matrix vector product calculation executed in statistical machine learning. However, the present invention is not limited to such an application and can be applied to the calculation of a sparse matrix vector product in various scientific and technical calculations, such as K-means method, singular value decomposition method, and Lanczos method.

The present invention can be used in the field of compressing and retaining a sparse matrix, and the field of calculating a sparse matrix vector product.

The whole or part of the example embodiments disclosed above can be described as, but not limited to, the following supplementary notes.

Supplementary Note 1

An information processing apparatus comprising:

a first transforming unit configured to divide a sparse matrix into a first submatrix including a row in which a number of non-zero elements is a predetermined number or more and a second submatrix including a row other than the row and transform the first submatrix into a first matrix of row-major order dense matrix format;

a second transforming unit configured to divide the second submatrix into a third submatrix including a column in which a number of non-zero elements is a predetermined number or more and a fourth submatrix including a column other than the column and transform the third submatrix into a second matrix of column-major order dense matrix format;

a third transforming unit configured to divide the fourth submatrix into a fifth submatrix and a sixth submatrix and transform the fifth submatrix into a third matrix of row-major order sparse matrix compression format; and a fourth transforming unit configured to transform the sixth submatrix into a fourth matrix of column-major order sparse matrix compression format.

Supplementary Note 2

The information processing apparatus according to Supplementary Note 1, wherein the third transforming unit is configured to divide the fourth submatrix into the fifth submatrix including a row in which a number of non-zero elements is a predetermined number or more and the sixth submatrix including a row other than the row.

Supplementary Note 3

The information processing apparatus according to Supplementary Note 2, wherein the second transforming unit is configured to rearrange the fourth submatrix in order of decreasing the number of the non-zero elements of each row and rearrange the second matrix in a same order as the rearranged fourth submatrix.

Supplementary Note 4

The information processing apparatus according to any of Supplementary Notes 1 to 3, wherein the row-major order sparse matrix compression format is a CRS (Compressed Row Storage) format.

Supplementary Note 5

The information processing apparatus according to any of Supplementary Notes 1 to 4, wherein the column-major order sparse matrix compression format is a JDS (Jagged Diagonal Storage) format.

Supplementary Note 6

The information processing apparatus according to any of Supplementary Notes 1 to 5, further comprising:

a storing unit configured to store the sparse matrix transformed into a set of the first matrix, the second matrix, the third matrix, and the fourth matrix, and a vector that can be multiplied by the sparse matrix to calculate a product; and a matrix vector product calculating unit configured to individually calculate a product of the first matrix and the vector, a product of the second matrix and the vector, a product of the third matrix and the vector, and a product of the fourth matrix and the vector, and add the calculated products to each other, thereby calculating a product of the sparse matrix and the vector.

Supplementary Note 7

The information processing apparatus according to Supplementary Note 6, wherein the matrix vector product calculating unit is configured to perform calculation of a sparse matrix vector product instructed by a learning unit configured to control statistical machine learning.

Supplementary Note 8

An information processing method comprising:

dividing a sparse matrix into a first submatrix including a row in which a number of non-zero elements is a predetermined number or more and a second submatrix including a row other than the row and transforming the first submatrix into a first matrix of row-major order dense matrix format;

dividing the second submatrix into a third submatrix including a column in which a number of non-zero elements is a predetermined number or more and a fourth submatrix including a column other than the column and transforming the third submatrix into a second matrix of column-major order dense matrix format;

dividing the fourth submatrix into a fifth submatrix and a sixth submatrix and transforming the fifth submatrix into a third matrix of row-major order sparse matrix compression format; and transforming the sixth submatrix into a fourth matrix of column-major order sparse matrix compression format.

Supplementary Note 9

A non-transitory computer-readable recording medium with a program recorded thereon, the program comprising instructions for causing a computer to perform:

a process to divide a sparse matrix into a first submatrix including a row in which a number of non-zero elements is a predetermined number or more and a second submatrix including a row other than the row and transform the first submatrix into a first matrix of row-major order dense matrix format;

a process to divide the second submatrix into a third submatrix including a column in which a number of non-zero elements is a predetermined number or more and a fourth submatrix including a column other than the column and transform the third submatrix into a second matrix of column-major order dense matrix format;

a process to divide the fourth submatrix into a fifth submatrix and a sixth submatrix and transform the fifth submatrix into a third matrix of row-major order sparse matrix compression format; and a process to transform the sixth submatrix into a fourth matrix of column-major order sparse matrix compression format.

DESCRIPTION OF NUMERALS

100, 200, 300, 400 information processing apparatus
111 communication I/F unit
112 operation input unit
113 screen display unit
115 storing unit
1151 program
1152 sparse matrix
1152-1 first submatrix
1152-2 second submatrix
1152-3 third submatrix
1152-4 fourth submatrix
1152-5 fifth submatrix
1152-6 sixth submatrix
11531 Rowmajor dense matrix
11532 Colmajor dense matrix
11533 CRS sparse matrix
11534 JDS sparse matrix
11535 row rearrangement information
116 arithmetic processing unit
1161 input unit
1162 matrix transforming unit
11621 Rowmajor dense matrix generating unit
11622 Colmajor dense matrix generating unit
11623 CRS sparse matrix generating unit
11624 JDS sparse matrix generating unit
1163 output unit
1164 matrix vector product calculating unit
11641 Rowmajor dense matrix vector product calculating unit
11642 Colmajor dense matrix vector product calculating unit
11643 CRS sparse matrix vector product calculating unit
11644 JDS sparse matrix vector product calculating unit
11645 sum calculating unit
11646 rearranging unit
1165 learning unit
401 first transforming unit
402 second transforming unit
403 third transforming unit
404 fourth transforming unit

What is claimed is:

1. An information processing apparatus comprising:

a memory containing program instructions; and a processor coupled to the memory, wherein the processor is configured to execute the program instructions to:

store a first submatrix for rows having a predetermined number or more of non-zero elements among rows in a sparse matrix in row-major order dense matrix format;

store a second submatrix for columns having a predetermined number or more of non-zero elements among columns of a third submatrix other than the first submatrix in the sparse matrix in column-major order dense matrix format;

store a fourth submatrix for a part of rows in a fifth submatrix other than the second submatrix among the third submatrix in row-major order sparse matrix compression format;

store a sixth submatrix other than the fourth matrix among the fifth submatrix in column-major order sparse matrix compression format;

store a vector that can be multiplied by the sparse matrix to calculate a product;

individually calculate a product of the submatrix stored in the column-major order dense matrix format and the vector, a product of the submatrix stored in the row-major order dense matrix format and the vector, a product of the submatrix in the row-major order sparse matrix compression format and the vector, and a product of the submatrix stored in the column-major order sparse matrix and the vector;

add the calculated products to each other, thereby calculating a product of the sparse matrix and the vector; and perform statistical machine learning by using the product of the sparse matrix and the vector.

2. The information processing apparatus according to claim 1, wherein the fourth submatrix is for rows having a predetermined number or more of non-zero elements among rows the fifth submatrix, and the sixth submatrix is for rows other than rows having a predetermined number or more of non-zero elements among rows the fifth submatrix.

3. The information processing apparatus according to claim 1, wherein the row-major order sparse matrix compression format is a CRS (Compressed Row Storage) format.

4. The information processing apparatus according to claim 1, wherein the column-major order sparse matrix compression format is a JDS (Jagged Diagonal Storage) format.

5. An information processing apparatus, comprising:

a memory containing program instructions; and a processor coupled to the memory, wherein the processor is configured to execute the program instructions to:

store a first submatrix for rows having a predetermined number or more of non-zero elements among rows in a sparse matrix in row-major order dense matrix format;

store a second submatrix for columns having a predetermined number or more of non-zero elements among columns of a third submatrix other than the first submatrix in the sparse matrix in column-major order dense matrix format;

store a fourth submatrix for a part of rows in a fifth submatrix other than the second submatrix among the third submatrix in row-major order sparse matrix compression format;

store a sixth submatrix other than the fourth matrix among the fifth submatrix in column-major order sparse matrix compression format;

store a vector that can be multiplied by the sparse matrix to calculate a product;

individually calculate a product of the submatrix stored in the column-major order dense matrix format and the vector, a product of the submatrix stored in the row-major order dense matrix format and the vector, a product of the submatrix in the row-major order sparse matrix compression format and the vector, and a product of the submatrix stored in the column-major order sparse matrix and the vector;

add the calculated products to each other, thereby calculating a product of the sparse matrix and the vector; and obtain a learned model by performing statistical machine learning according to a parameter vector indicating a set of parameters of a model to be learned, by using the product of the sparse matrix and the vector.

* * * * *